US009510052B2

United States Patent
Tanaka et al.

(10) Patent No.: US 9,510,052 B2
(45) Date of Patent: Nov. 29, 2016

(54) BROADCAST RECEIVING TERMINAL, CONTROL METHOD, DISPLAY TERMINAL, AND RECORDING MEDIUM

(71) Applicant: SHARP KABUSHIKI KAISHA, Osaka-shi, Osaka (JP)

(72) Inventors: Kimihiro Tanaka, Osaka (JP); Hideki Mitani, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/666,835

(22) Filed: Mar. 24, 2015

(65) Prior Publication Data

US 2015/0281791 A1   Oct. 1, 2015

(30) Foreign Application Priority Data

Mar. 25, 2014 (JP) ................ 2014-062526

(51) Int. Cl.
*H04N 5/445* (2011.01)
*G06F 3/00* (2006.01)
*G06F 13/00* (2006.01)
*H04N 21/472* (2011.01)
*H04N 21/433* (2011.01)

(52) U.S. Cl.
CPC .... *H04N 21/47214* (2013.01); *H04N 21/4334* (2013.01)

(58) Field of Classification Search
USPC ................................... 725/58, 61
See application file for complete search history.

(56) References Cited

U.S. PATENT DOCUMENTS

| | | | | | |
|---|---|---|---|---|---|
| 5,805,763 | A | * | 9/1998 | Lawler | H04N 5/44543 348/E5.105 |
| 2009/0288117 | A1 | | 11/2009 | Imura | |
| 2012/0317600 | A1 | * | 12/2012 | Bernard | H04N 21/4334 725/40 |

FOREIGN PATENT DOCUMENTS

| | | |
|---|---|---|
| JP | 2003-143517 A | 5/2003 |
| JP | 2007-324636 A | 12/2007 |
| JP | 2009-177673 A | 8/2009 |
| JP | 2010-141781 A | 6/2010 |

* cited by examiner

*Primary Examiner* — Hunter B Lonsberry
(74) *Attorney, Agent, or Firm* — Birch, Stewart, Kolasch & Birch, LLP

(57) ABSTRACT

There is provided a broadcast receiving terminal that includes a reception unit, a display unit, and a reservation unit. The reception unit receives, over a network, content information, the content information including trailer information and reception reservation information. The display unit displays trailer content. The reservation unit reserves reception of the broadcast program.

12 Claims, 28 Drawing Sheets

FIG. 3

| CP NAME | OO STREAM |
|---|---|
| BROADCASTING STATION NAME | CS GG TELEVISION |
| CHANNEL NAME | CS GG TELEVISION TRAILER CHANNEL |
| TRAILER TITLE | HIGHLIGHTS OF A TALE OF THE QUEST FOR THE RING |
| INTRODUCTORY TRAILER MESSAGE | FANTASY STORY THAT DESCRIBES A BATTLE BETWEEN FIVE SELECTED BRAVE MEN AND AN EVIL FORCE IN QUEST OF THE RING |
| COPYRIGHT INDICATION | © RR STUDIOS |
| TRAILER START DATE | 12/1/2013 00:00 |
| TRAILER END DATE | 12/31/2013 23:59 |
| TAGS | FOREIGN FILM, TV, NATIONWIDE |
| TRAILER STATIC IMAGE URL | http://marumarustream.co.jp/www09/media/00005982_thumb.jpg |
| TRAILER MOVING IMAGE URL | https://ssl.marumarustream.co.jp/cpc09/00005982_movie.cpc |
| BROADCASTING STATION NAME | CS GG TELEVISION |
| CHANNEL NAME | MOVIE CHANNEL |
| CHANNEL NUMBER | CS XXX |
| BROADCAST PROGRAM NAME | A TALE OF THE QUEST FOR THE RING |
| NETWORK ID | 12AB |
| SERVICE ID | 34CD |
| EVENT ID | 56EF |
| BROADCAST START DATE/TIME | 03/22/2013 20:00 |
| PROGRAM DURATION | 01:56:30 |
| CONTRACT INFORMATION | 01010101 |

FIG. 4

| TAG TYPE | EXAMPLES |
|---|---|
| GENRE | FOREIGN FILM, JAPANESE FILM, DRAMA, SPORT, AND SO ON |
| OUTPUT-ENABLING DEVICE | TV, PC, MOBILE |
| REGION | NATIONWIDE, KANTO, KANSAI, HOKKAIDO, TOKYO, AND SO ON |
| VIEWER AGE RESTRICTION | PG-12, R-15, R-18, ADULT |
| RECOMMENDATION | RECOMMENDED, DON'T-MISS-IT CAMPAIGN |

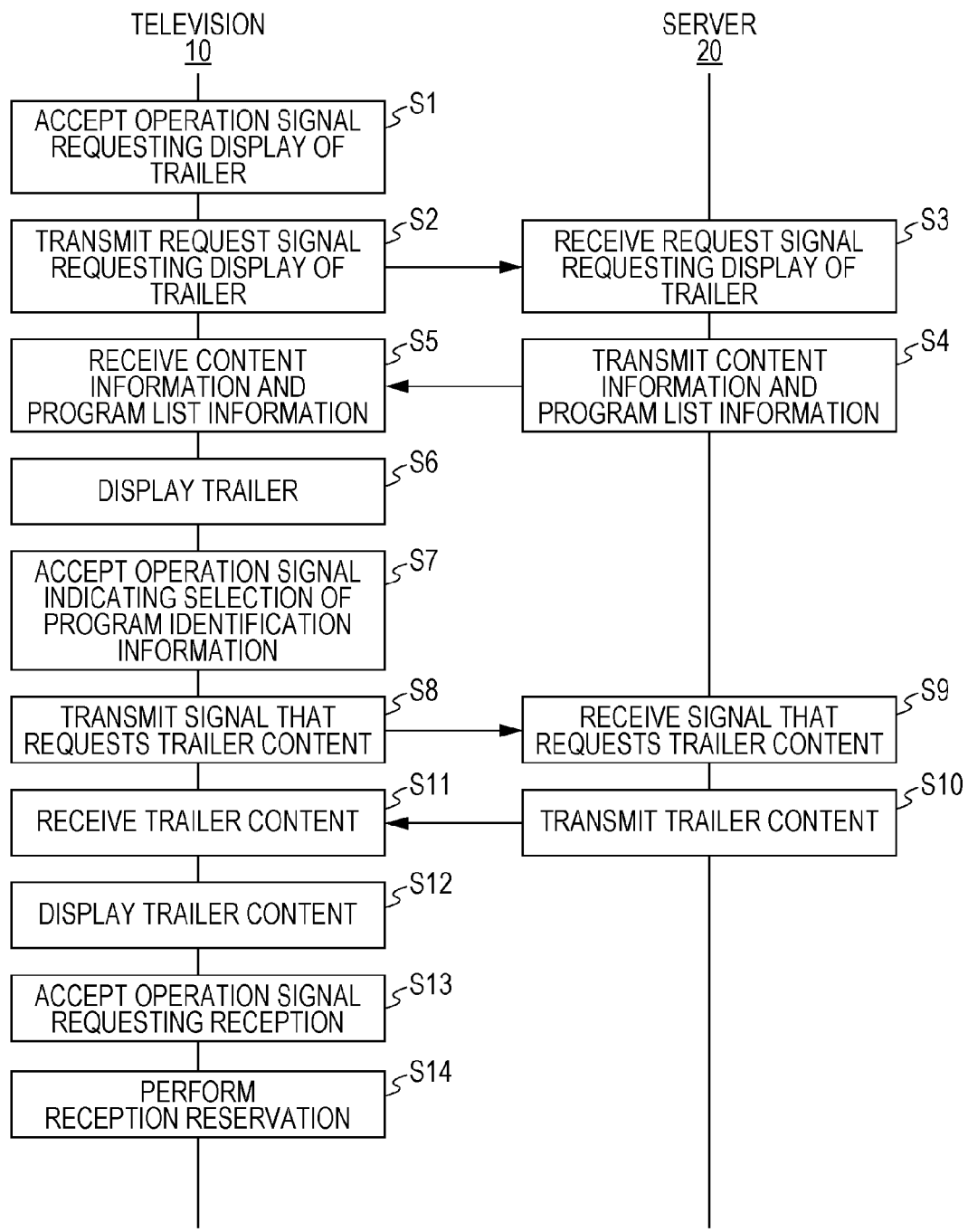

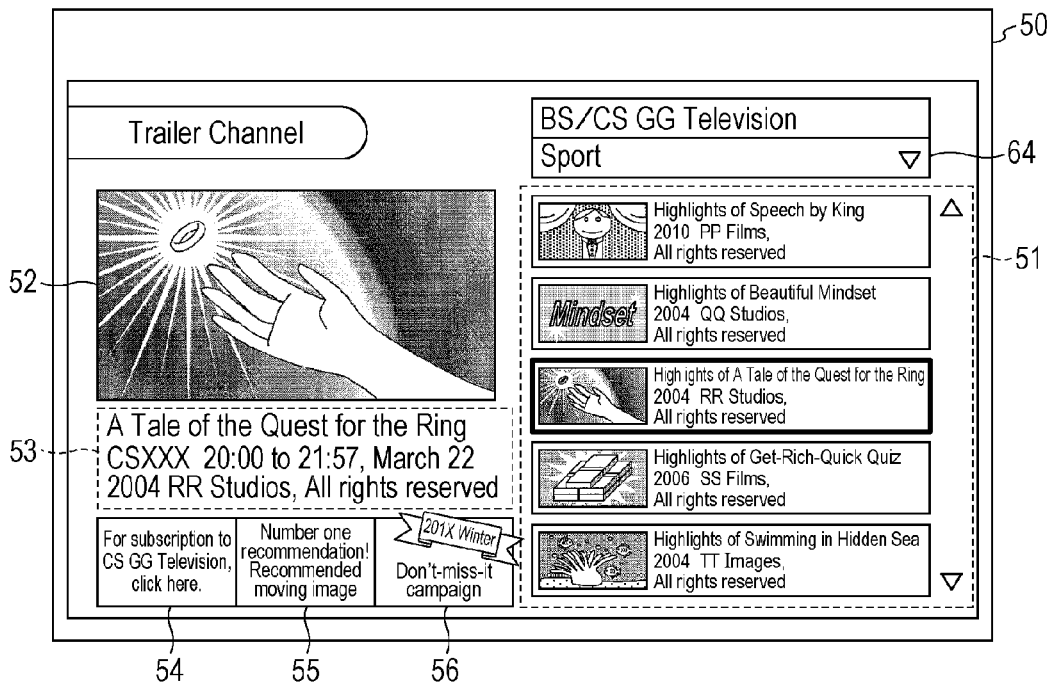

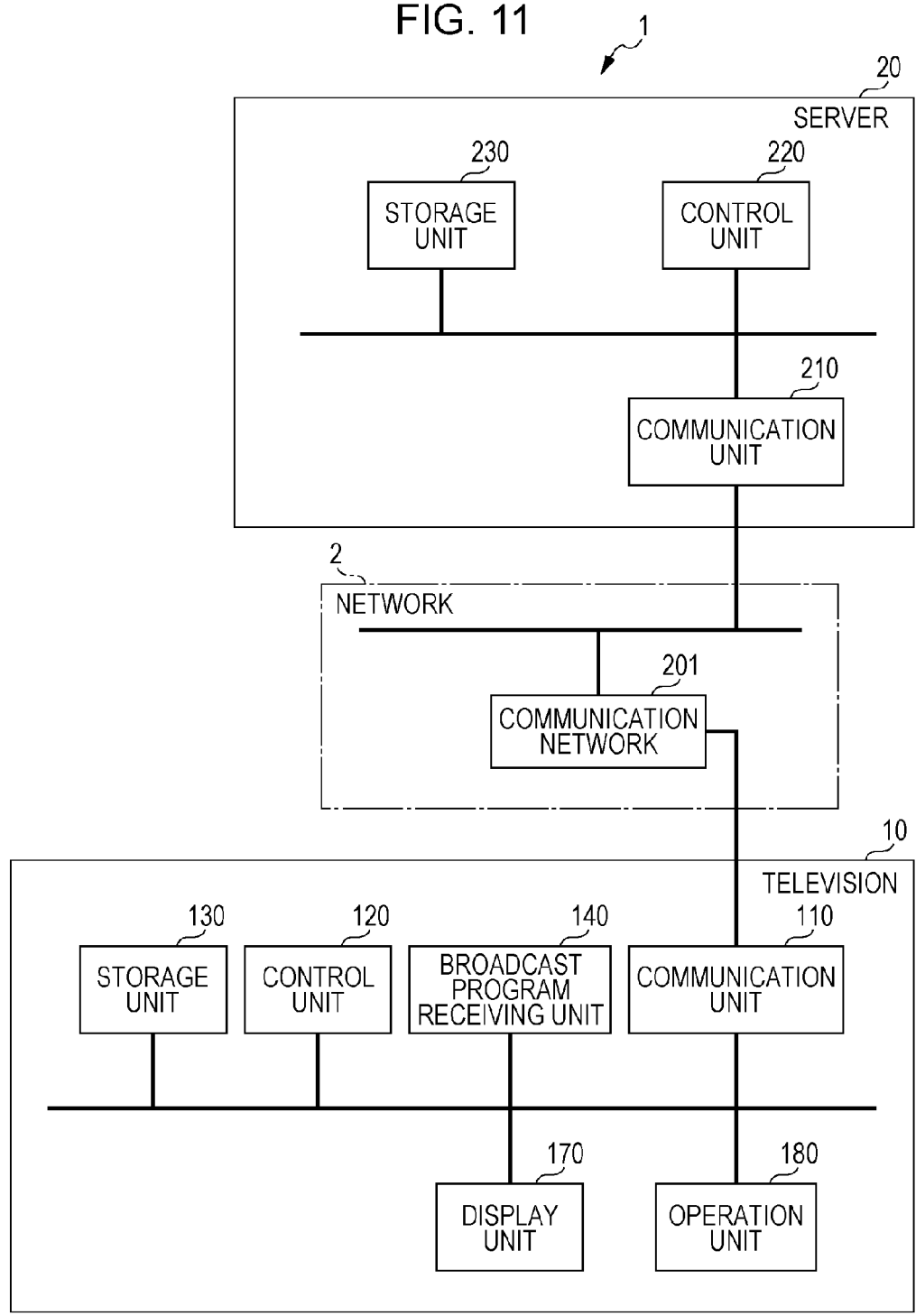

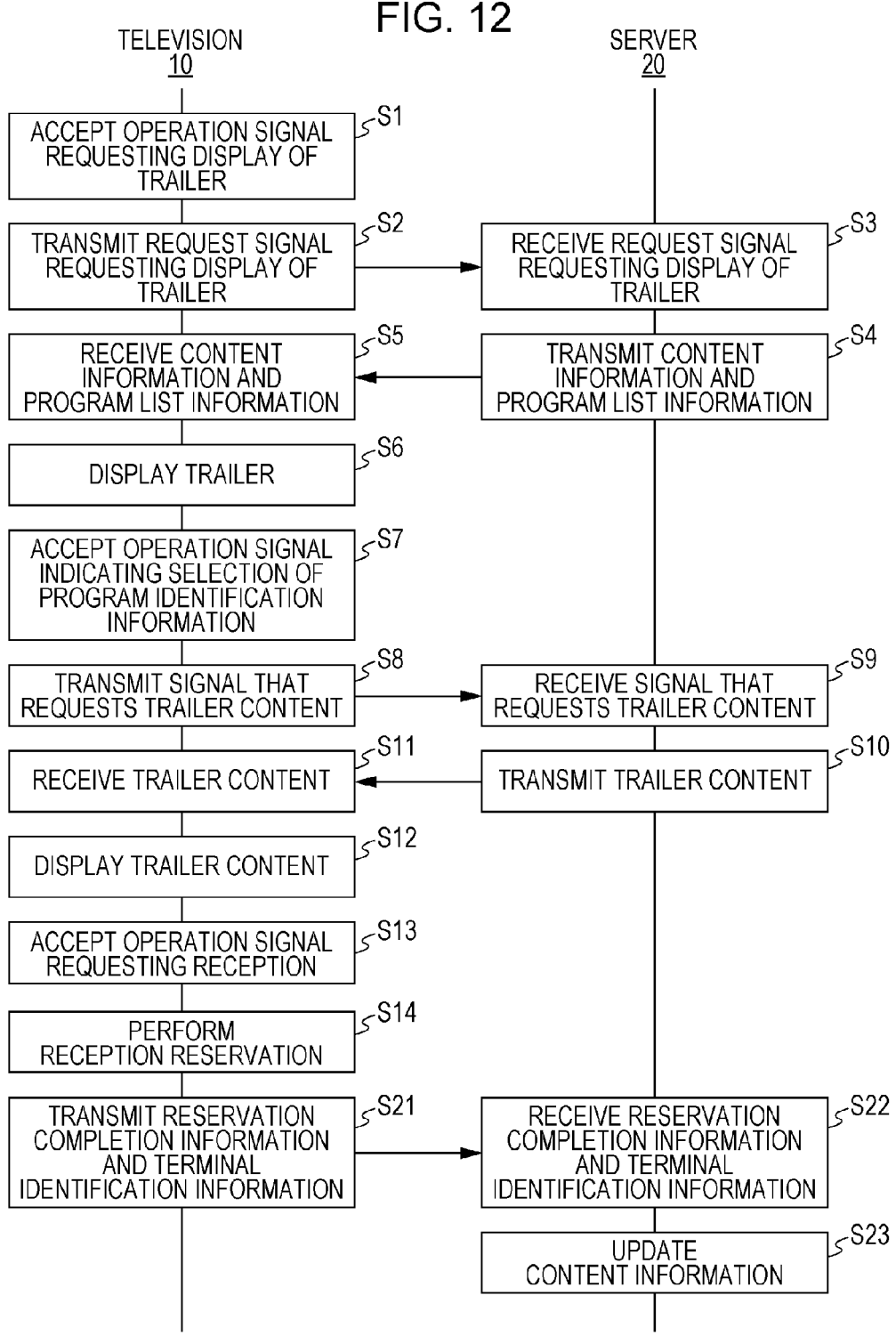

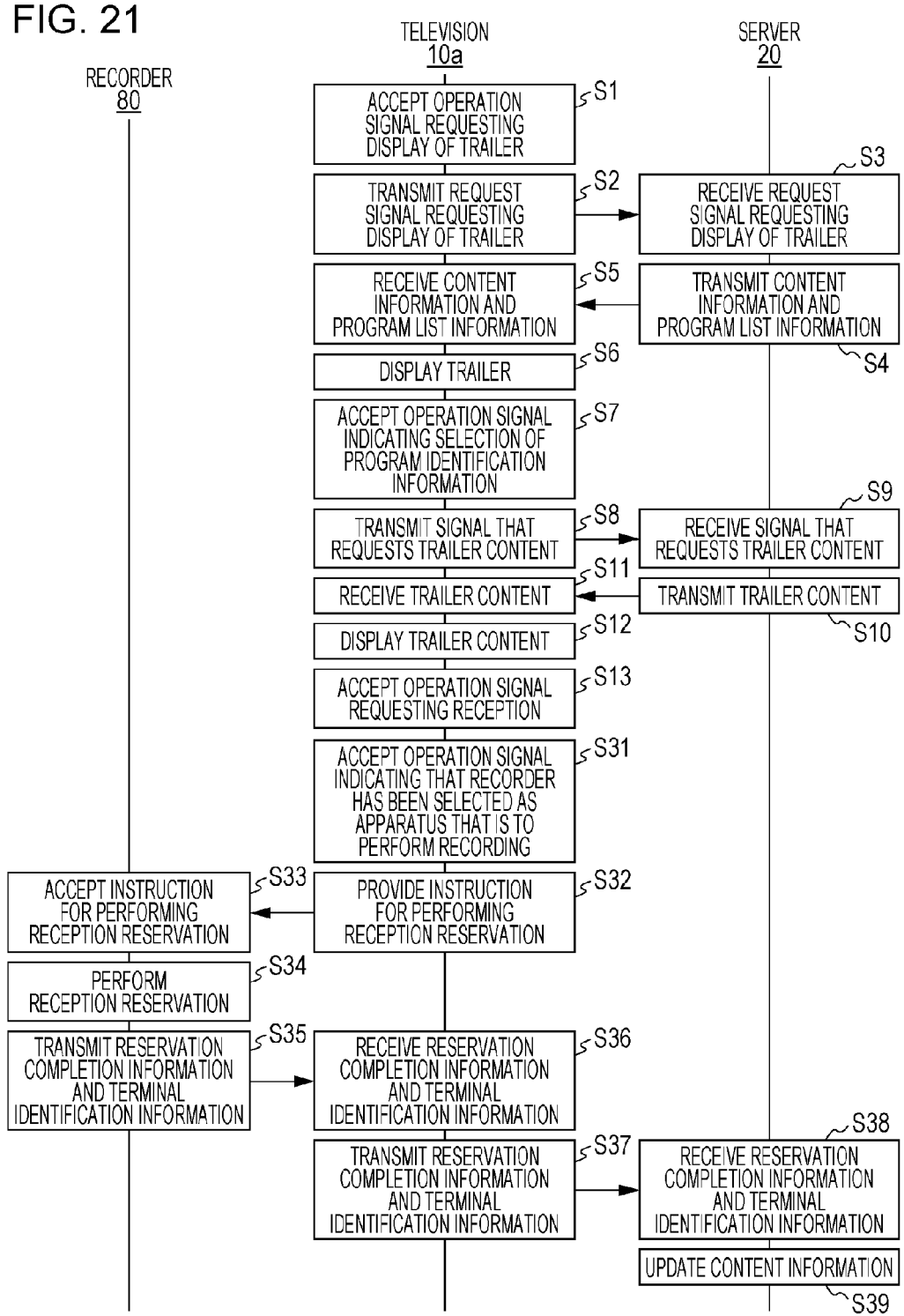

| TRAILER CONTENT RECEIVING DEVICE ID | RECEPTION RESERVATION DEVICE ID 1 | RECEPTION RESERVATION DEVICE ID 2 | ... |
|---|---|---|---|
| 03D0311 | 03D0311 | | |
| A8F133 | 1023975G | | |
| 0xD-0045 | 04F0079 | 8575593384 | |

FIG. 28

| USER ID | PASSWORD | MAC ADDRESS OF TELEVISION | MAC ADDRESS OF TRAILER CONTENT RECEIVING TERMINAL 1 | MAC ADDRESS OF TRAILER CONTENT RECEIVING TERMINAL 2 | ...... | MAC ADDRESS OF TRAILER CONTENT RECEIVING TERMINAL 6 |
|---|---|---|---|---|---|---|
| 0001 | password1 | 00:01:02:03:04:05 | 10:11:12:13:14:15 | 16:17:18:19:1A:1B | ...... | 1C:1D:1E:1F:10:11 |
| 0002 | password2 | 00:01:02:06:07:08 | 20:21:22:23:24:25 | 26:27:28:29:2A:2B | ...... | 2C:2D:2E:2F:20:21 |
| 0003 | password3 | 00:01:02:09:0A:0B | 30:31:32:33:34:35 | 36:37:38:39:3A:3B | ...... | 3C:3D:3E:3F:30:31 |
| 0004 | password4 | 00:01:02:0C:0D:0E | 40:41:42:43:44:45 | 46:47:48:49:4A:4B | ...... | 4C:4D:4E:4F:40:41 |

BROADCAST RECEIVING TERMINAL, CONTROL METHOD, DISPLAY TERMINAL, AND RECORDING MEDIUM

BACKGROUND

1. Field

The present disclosure relates to a broadcast receiving terminal that reserves reception of broadcast programs, a control method for a server that transmits trailers of broadcast programs, a display terminal that provides reception reservation instructions, and a recording medium that records a control program for the display terminal.

2. Description of the Related Art

In a case where a viewer who has viewed a trailer of a broadcast program desires to view the broadcast program, the viewer usually needs to memorize the channel on which the broadcast program is to be broadcast and the date and time of broadcast, or take notes on the broadcast program. Accordingly, a technique has been disclosed with which a viewer is able to more easily perform viewing reservation and recording reservation while viewing a trailer of a broadcast program.

For example, Japanese Unexamined Patent Application Publication No. 2010-141781 (published on Jun. 24, 2010) discloses a receiving apparatus that displays reservation-enticing button content for enticing a viewer to reserve viewing of a broadcast program while displaying a trailer of the broadcast program. When the reservation-enticing button is selected by a viewer, the receiving apparatus performs viewing reservation and recording reservation of the broadcast program.

However, in the related art described above, the broadcasting station determines the time at which the broadcasting station broadcasts the trailer of the broadcast program. Therefore, the receiving apparatus is unable to show a viewer the trailer when the viewer desires to view the trailer, which is an issue. Furthermore, the viewer may miss a broadcast program of interest, which is also an issue.

SUMMARY

The present disclosure has been made in view of the above-described issues, and there are provided a broadcast receiving terminal, a server, a control method, a display terminal, and a recording medium which make it possible to show a user trailer content at a timing that the user desires and to reserve reception of a broadcast program associated with the trailer content.

According to an aspect of the present disclosure, there is provided a broadcast receiving terminal including a reception unit, a display unit, and a reservation unit. The reception unit receives, over a network, trailer content that provides a preview of a broadcast program, and content information associated with the trailer content. The display unit displays the trailer content received by the reception unit. The reservation unit reserves reception of the broadcast program with reference to the content information in response to acceptance of an operation signal requesting reception of the broadcast program.

According to an aspect of the present disclosure, there is provided a control method for controlling a server. The control method includes: receiving reservation completion information indicating that reception has been reserved for a broadcast program, and terminal identification information that identifies a terminal which has reserved reception of the broadcast program; and transmitting, over a network, (1) content information associated with trailer content that provides a preview of the broadcast program, and (2) reception reservation completion information indicating that reception has been reserved for the broadcast program, in a case where the reservation completion information has been received.

According to an aspect of the present disclosure, there is provided a display terminal connected to a broadcast receiving terminal, the display terminal including a terminal reception unit, a display unit, and a reception reservation instructing unit. The terminal reception unit receives, over a network, trailer content that provides a preview of a broadcast program, and content information associated with the trailer content. The display unit displays the trailer content received by the terminal reception unit. The reception reservation instructing unit provides, to the broadcast receiving terminal, a reception reservation instruction for reserving reception of the broadcast program with reference to the content information in response to acceptance of an operation signal requesting reception of the broadcast program.

According to an aspect of the present disclosure, there is provided a broadcast receiving terminal including a reception unit, a display unit, and a reservation unit. The reception unit receives, over a network, trailer content that provides a preview of a broadcast program, and content information associated with the trailer content. The display unit displays the trailer content received by the reception unit. The reservation unit refers to the content information in response to acceptance of an operation signal indicating selection of the broadcast program, and allowing acceptance of reception reservation of the broadcast program.

BRIEF DESCRIPTION OF THE DRAWINGS

FIG. 3 illustrates an example of content information in the reception reservation system according to the first embodiment of the present disclosure;

FIG. 4 is a table that lists the types of tags in content information in the reception reservation system according to the first embodiment of the present disclosure;

FIG. 5 is a sequence chart illustrating a process performed by the reception reservation system according to the first embodiment of the present disclosure;

FIGS. 7A and 7B illustrate examples of trailers displayed on the display of the television in the reception reservation system according to the first embodiment of the present disclosure;

FIG. 11 is a block diagram schematically illustrating a hardware configuration of the reception reservation system according to the first embodiment of the present disclosure;

FIG. 12 is a sequence chart illustrating a process performed by the reception reservation system according to a second embodiment of the present disclosure;

FIG. 21 is a sequence chart illustrating a process performed by the reception reservation system according to the seventh embodiment of the present disclosure;

FIG. 28 is a diagram illustrating a database saved in a remote access server in the eighth embodiment of the present disclosure.

DESCRIPTION OF THE EMBODIMENTS

Figure 1:
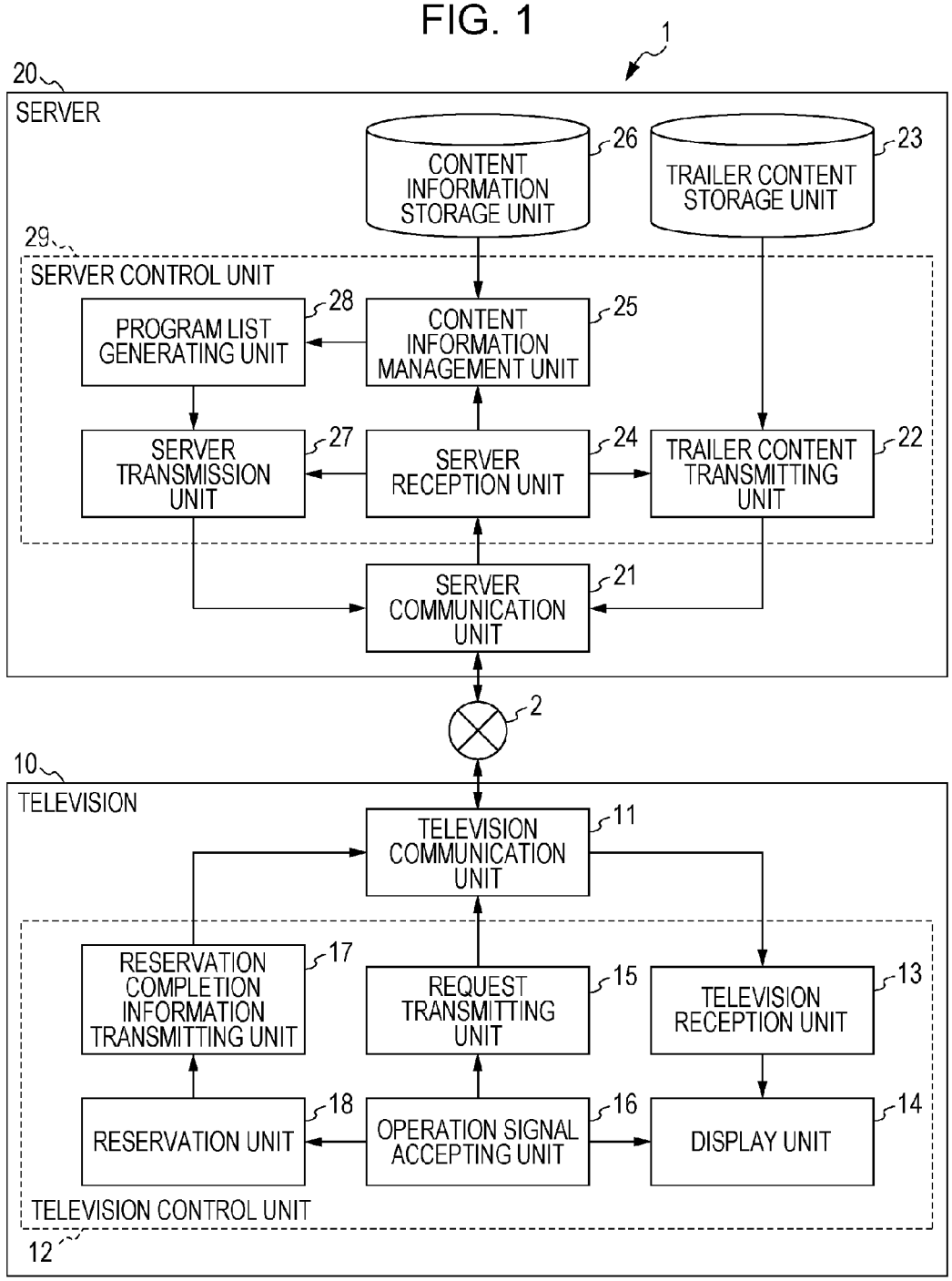
FIG. 1 is a block diagram illustrating a configuration of a reception reservation system according to a first embodiment of the present disclosure.

Hereinafter, embodiments of the present disclosure will be described in detail. Description of a configuration other than those described in the embodiments below may be omitted as appropriate. If description of such a configuration is given in another embodiment, the configuration is considered to be the same as described in the other embodiment. For the convenience of description, a member having the same function as that illustrated in the embodiments is assigned the same reference numeral, and description thereof will be omitted as appropriate. Note that description will be given herein while assuming a television as a broadcast receiving terminal; however, the present disclosure is not limited to this case, and is applicable to other broadcast receiving terminals, such as a personal computer (PC), a smartphone, and the like, for example.

First Embodiment

Figure 2:
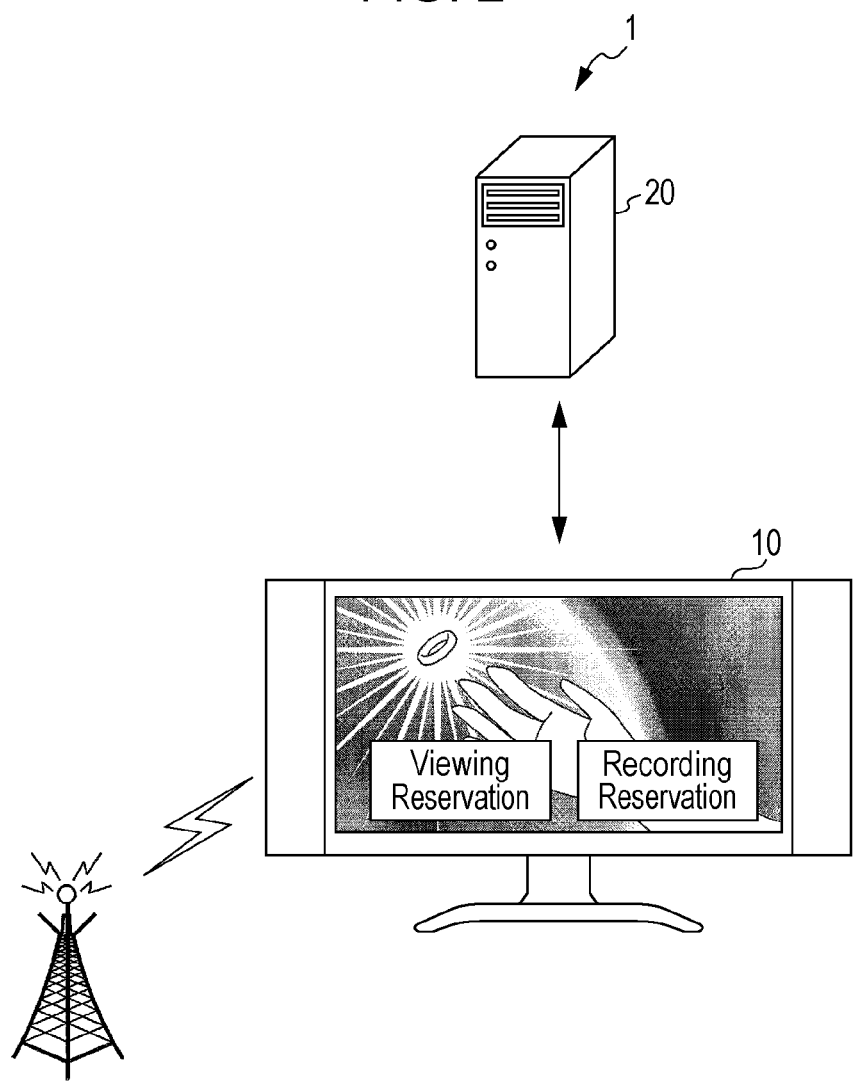
FIG. 2 is a diagram schematically illustrating the reception reservation system according to the first embodiment of the present disclosure.

FIG. 2 is a diagram schematically illustrating a reception reservation system 1 according to a first embodiment of the present disclosure. As illustrated in FIG. 2, the reception reservation system 1 is constituted by a server (external server) 20 and a television (broadcast receiving terminal) 10. The server 20 and the television 10 that constitute the reception reservation system 1 will be described in detail with reference to FIG. 1.

FIG. 1 is a block diagram illustrating a configuration of the reception reservation system 1 according to the first embodiment of the present disclosure. As illustrated in FIG. 1, the reception reservation system 1 is constituted by the television 10 and the server 20. In the reception reservation system 1, the server 20 transmits (delivers) trailer content of a broadcast program to be received by the television 10 to the television 10 over a network 2, and the television 10 displays the received trailer content on the display. The television 10 is able to reserve reception of the broadcast program on the display displaying the trailer content.

Here, a broadcast program typically refers to a program that is broadcast (delivered) from a broadcasting station or a broadcasting server regardless of a user request. A broadcast program may be broadcast via a broadcast wave or may be delivered over a network. The broadcasting station or the broadcasting server determines in advance the date and time for the broadcasting station or the broadcasting server to broadcast (deliver) a broadcast program. Therefore, the television 10 is unable to determine the date and time of receiving the broadcast program and is unable to request the broadcasting station or the broadcasting server to broadcast the broadcast program at a specific date and time.

Trailer content refers to content that provides a preview of a broadcast program. The television 10 receives trailer content from the server 20 over the network 2. Therefore, the television 10 is able to receive trailer content at a timing that a user desires as long as the desired timing is within a period in which the server 20 is allowed to transmit the trailer content, and to display the trailer content. The period in which the server 20 is allowed to transmit trailer content will be described in detail below.

Reception reservation is an operation performed by the television 10 to reserve reception of a broadcast program, and more specifically, includes viewing reservation and recording reservation.

Television 10

The television 10 includes a television communication unit 11 and a television control unit 12, as illustrated in FIG. 1.

The television communication unit 11 has a function that enables transmission/reception of data to/from the server 20 over the network 2.

The television control unit 12 performs overall control of each unit in the television 10. The television control unit 12 will be described in detail below.

Television Control Unit 12

The television control unit 12 also functions as a television reception unit (reception unit or terminal reception unit) 13, a display unit (extracting unit) 14, a request transmitting unit 15, an operation signal accepting unit (trailer content selecting unit) 16, a reservation completion information transmitting unit (transmission unit or terminal transmission unit) 17, and a reservation unit 18, as illustrated in FIG. 1.

The television reception unit 13 controls the television communication unit 11 and receives data received by the television communication unit 11 over the network 2. The television reception unit 13 outputs the received data to the display unit 14. The television reception unit 13 is able to receive broadcast programs described above and is also able to receive content other than broadcast programs.

The display unit 14 refers to the received data and performs control in order to display an image on the display of the television 10.

The request transmitting unit 15 refers to operation information received from the operation signal accepting unit 16 and transmits, via the television communication unit 11, a signal that requests the server 20 to transmit data.

The operation signal accepting unit 16 accepts information input by a user and outputs the accepted information to each unit that is connected to the operation signal accepting unit 16, as an operation signal.

The reservation completion information transmitting unit 17 transmits, in a case where the television 10 has reserved reception of a broadcast program, reservation completion information indicating that reception has been reserved for the broadcast program, to the server 20 via the television communication unit 11.

The reservation unit 18 reserves, in a case where an operation signal requesting reception of a broadcast program has been accepted, reception of the broadcast program. The reservation unit 18 performs reception reservation by referring to reception reservation information described below, or may perform reception reservation by using an electronic program guide (EPG).

Note that the television 10 includes a broadcast program receiving unit, which is not illustrated in FIG. 1. The broadcast program receiving unit is able to receive broadcast programs described above via broadcast waves. The broadcast program receiving unit receives a broadcast program at the start time of the broadcast program for which the reservation unit 18 has reserved reception. The broadcast program receiving unit outputs the received broadcast program to the display unit 14 in a case where the reception reservation is "viewing reservation", and records the received program to a hard disk drive (HDD), which is not illustrated, externally connected to the television 10 in a case where the reception reservation is "recording reservation".

Server 20

The server 20 includes a server communication unit 21, a trailer content storage unit 23, a content information storage unit 26, and a server control unit 29, as illustrated in FIG. 1.

The server communication unit 21 is able to transmit/receive data to/from the television 10 over the network 2.

The trailer content storage unit 23 stores pieces of trailer content therein. The server control unit 29 is able to read the pieces of trailer content stored in the trailer content storage unit 23.

The content information storage unit 26 stores pieces of content information therein. The server control unit 29 is able to read the pieces of content information stored in the content information storage unit 26.

The server control unit 29 performs overall control of each unit in the server 20. The server control unit 29 will be described in detail below.

Server Control Unit 29

The server control unit 29 also functions as a trailer content transmitting unit (server transmission unit) 22, a server reception unit (reception unit) 24, a content information management unit 25, a server transmission unit (transmission unit) 27, and a program list generating unit 28, as illustrated in FIG. 1.

The trailer content transmitting unit 22 receives a signal that requests trailer content, from the server reception unit 24. Then, the trailer content transmitting unit 22 obtains a piece of trailer content corresponding to the signal from the trailer content storage unit 23, and transmits the piece of trailer content to the television 10.

The server reception unit 24 controls the server communication unit 21 and receives data from the server communication unit 21. The server reception unit 24 outputs the received data to each unit in the server control unit 29.

The content information management unit 25 manages the pieces of content information stored in the content information storage unit 26. More specifically, when the content information management unit 25 has received, from the server reception unit 24, a request signal requesting display of a trailer, the content information management unit 25 obtains one or more pieces of content information corresponding to the received request signal from the content information storage unit 26, and outputs the obtained one or more pieces of content information to the program list generating unit 28.

The server transmission unit 27 transmits received information to the television 10 via the server communication unit 21.

The program list generating unit 28 generates program list information by referring to the received one or more pieces of content information. The program list information will be described in detail below.

Details of Each Type of Data

In the reception reservation system 1, the server 20 transmits to the television 10 trailer content, program list information, and content information. The trailer content, the program list information, and the content information will be described in detail below.

The trailer content refers to content that provides a preview of a broadcast program, and specifically includes at least either of a static image and a moving image.

The program list information is information for displaying a program list including one or more pieces of program identification information that respectively identify one or more broadcast programs. While it is possible to obtain program identification information from content information described below, program identification information is not limited to such information. For example, a program identification information storage unit that only stores pieces of program identification information therein may be provided, and one or more pieces of program identification information may be obtained from the program identification information storage unit.

The content information includes trailer information associated with trailer content that provides a preview of a broadcast program, and reception reservation information for reserving reception of the broadcast program. The content information will be described in detail with reference to FIGS. 3 and 4. FIG. 3 illustrates an example of the content information in the reception reservation system 1 according to the first embodiment of the present disclosure. FIG. 4 is a table that lists the types of tags in the content information in the reception reservation system 1 according to the first embodiment of the present disclosure.

Trailer Information

The trailer information is information associated with trailer content. A state where the trailer information is associated with trailer content refers to a state where the trailer information includes information that indicates a link to the trailer content, but is not limited to such a state. For example, the state where the trailer information is associated with trailer content includes a state where the trailer information includes the trailer content itself. In FIG. 3, a content provider (CP) name, a broadcasting station name, a channel name, a trailer title, an introductory trailer message, a copyright indication, a trailer start date, a trailer end date, tags, a trailer static image uniform resource locator (URL), and a trailer moving image URL are included in the trailer information.

The CP name is information indicating the name of a content provider that provides the trailer content.

The broadcasting station name is information indicating the name of a broadcasting station that transmits the trailer content or the name of a broadcasting station that reserves the right of the broadcast program.

The channel name is information indicating the name of a channel to which the trailer content belongs.

The trailer title is information indicating the title of the trailer content.

Figure 10A:
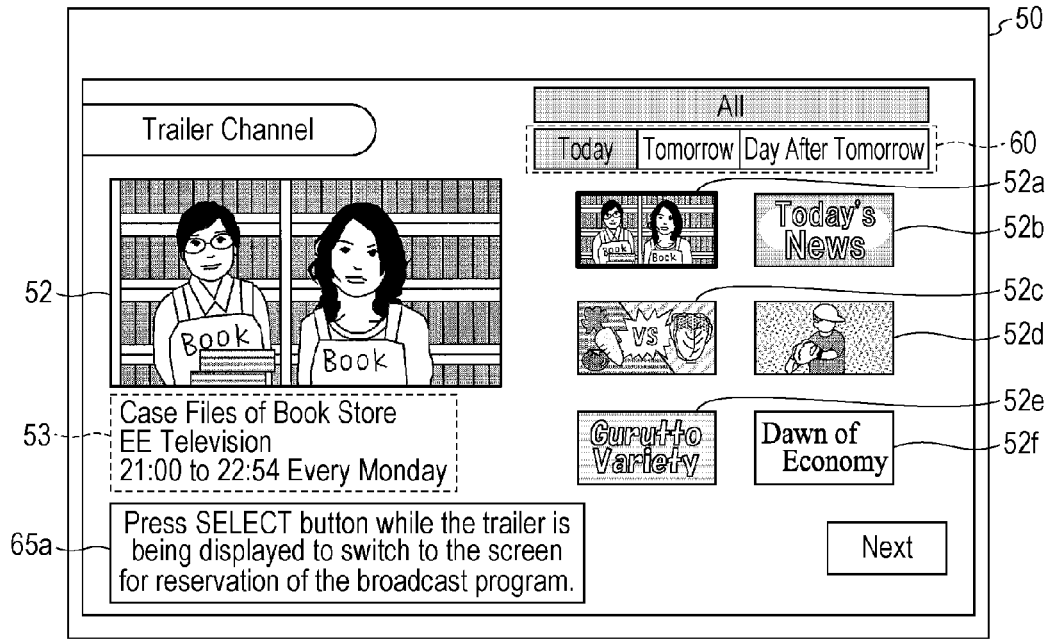
FIGS. 10A and 10B illustrate examples of introductory trailer screens displayed on the display of the television in the reception reservation system according to the first embodiment of the present disclosure.
Figure 10B:
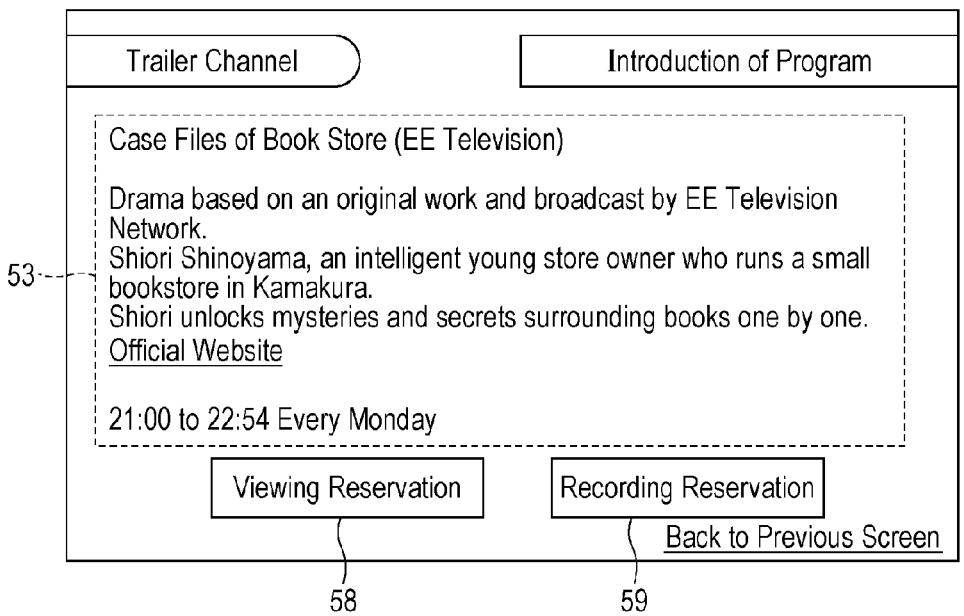

The introductory trailer message is information indicating a text for introducing the broadcast program for which the trailer content provides a preview and may be information indicating a link to the text for introducing the broadcast program for which the trailer content provides a preview. The introductory trailer message may include both of the information indicating a text for introducing the broadcast program for which the trailer content provides a preview, and the information indicating a link to the text for introducing the broadcast program. For example, as illustrated in FIG. 10B, the introductory trailer message (a detailed indication 53) may be configured to include information indicating a text for introducing a broadcast program and information indicating a link, such as "<a href="http://csxxx.co.jp/ring/promo.html">official website</a>", described by using a generally used Hyper Text Markup Language (HTML), which will be described in detail below.

The copyright indication is information indicating a party to which the copyright of the trailer content belongs or a party to which the copyright of the broadcast program for which the trailer content provides a preview belongs.

The trailer start date is information indicating the date and time when the server 20 is allowed to transmit the trailer content.

The trailer end date is information indicating the date and time when the server 20 is no longer allowed to transmit the trailer content. That is, a period in which a user is able to view trailer content is the above-described period in which the server 20 is allowed to transmit the trailer content, that is, a period from the trailer start date to the trailer end date.

The tag is attribute information indicating an attribute of the broadcast program. The tag is associated with the broadcast program, and therefore, is also associated with the program identification information that identifies the broadcast program. The tag will be described in detail below with reference to FIG. 4.

The trailer static image URL is, in a case where the trailer content is a static image, information that indicates a link to the static image.

The trailer moving image URL is, in a case where the trailer content is a moving image, information that indicates a link to the moving image. Note that the trailer moving image URL is not limited to information that directly indicates a location where the moving image is present, and may be information that indicates a link to a replay control file (for example, a Cartesian Perceptual Compression (CPC) file) that includes a method for replaying the trailer moving image, a location where the moving image is present, and the like, for example.

Note that the trailer information includes at least the trailer title and either of the trailer static image URL and the trailer moving image URL. The CP name, the broadcasting station name, and the channel name may differ from one another, as illustrated in FIG. 3, or may be the same.

Types of Tags

As described above, the tag is attribute information indicating an attribute of the broadcast program. The types of tags will be specifically described with reference to FIG. 4.

The types of tags include genre, output-enabling device, region, viewer age restriction, and recommendation.

Genre is information indicating the content of the broadcast program, examples of which include "foreign film", "Japanese film", "drama", and "sport".

Output-enabling device is information indicating a device that is capable of displaying the broadcast program, examples of which include "TV", "PC", and "mobile".

Region is information indicating a region where the broadcast program is broadcast, examples of which include "nationwide", "Kanto", "Kansai", "Hokkaido", and "Tokyo".

Viewer age restriction is information indicating a viewer age restriction that is put on the broadcast program, examples of which include PG-12, R-15, R-18, and adult.

Recommendation is information that is set in a case where the broadcasting station that broadcasts the broadcast program, the CP that transmits trailer content of the broadcast program, or the like especially entices a viewer to view the broadcast program, examples of which include "recommended" and "don't-miss-it campaign".

The tag need not be attribution information indicating the content of the broadcast program, and may be attribute information indicating an attribute of trailer content of the broadcast program. Alternatively, the trailer information may be configured to include a broadcast program tag that indicates an attribute of the broadcast program and a trailer content tag that indicates an attribute of trailer content of the broadcast program. For example, in a case where "TV" is specified as the broadcast program tag relating to the output-enabling device, and "PC" and "mobile" are specified as the trailer content tags relating to the output-enabling devices, a PC and a mobile terminal that have received content information including such tags display the trailer content, and the television 10 that has received content information including such tags displays the broadcast program. Accordingly, in this configuration, a user is able to view the trailer content on a PC and a mobile terminal, and is able to view the broadcast program only on TV. That is, it is possible to display, on a PC and a mobile terminal, the trailer content of the broadcast program that can be viewed or recorded only on TV, and therefore, the trailer content is more frequently displayed to users. In this case, a text that indicates the output-enabling device specified by the broadcast program tag (for example, a text, such as "this broadcast program is viewable only on television") may be displayed on a screen displaying the trailer content.

Reception Reservation Information

The reception reservation information is information for reserving reception of a broadcast program, and more specifically, is information referred to by the reservation unit 18 of the television 10 in order to reserve reception of a broadcast program. In FIG. 3, a broadcasting station name (broadcasting station information), a channel name, a channel number, a broadcast program name, a network identification (ID), a service ID, an event ID, a broadcast start date/time (broadcast date/time information), a program duration, and contract information (charge information) are included in the reception reservation information.

The broadcasting station name is information indicating the name of a broadcasting station that transmits the broadcast program.

The channel name is information indicating the name of a channel on which the broadcast program is broadcast.

The channel number is information indicating the channel number of a channel on which the broadcast program is broadcast.

The broadcast program name is information indicating the name of the broadcast program.

The network ID is information that identifies digital broadcast via which the broadcast program is broadcast among a plurality of types of digital broadcast using different transmission paths, such as terrestrial digital broadcast, broadcasting satellite (BS) broadcast, communication satellite (CS) broadcast, and the like, and is represented by a hexadecimal number of four characters, for example.

The service ID is an ID that identifies a broadcasting station that broadcasts the broadcast program, and is represented by a hexadecimal number of four characters, for example.

The event ID is an ID that identifies the broadcast program, and is represented by a hexadecimal number of four characters, for example.

The broadcast start date/time is information indicating the date and time (broadcast date/time) when broadcast of the broadcast program starts.

The program duration is information indicating the length of a period over which the broadcast program is broadcast.

The contract information is information indicating a contract needed to view the broadcast program, and is represented with eight bits, for example. The television 10 refers to the contract information to thereby determine whether or not the television 10 is in a state where the television 10 is allowed to display the broadcast program, that is, whether or not the television 10 is able to display the broadcast program, and, if the television 10 is able to display the broadcast program, determine whether or not there is a charge for the broadcast program. The television 10 is able to determine whether or not the television 10 is in the state where the television 10 is allowed to display the broadcast program by referring to a B-CAS card inserted into the television 10, for example.

Note that the reception reservation information includes at least the network ID, the service ID, the event ID, the broadcast start date/time, and the program duration. Here, in a case where the network ID indicates that the broadcast program is a broadcast program transmitted via terrestrial digital broadcast, the service ID indicates "AA Television", the event ID indicates "AA Television Special", the broadcast start date/time indicates "Jan. 1, 2013, 8:00 p.m.", and the program duration indicates "2 hours", for example, the reservation unit 18 is able to reserve reception of "AA Television Special" broadcast by AA Television that provides terrestrial digital broadcast for two hours from 8:00 p.m. on Jan. 1, 2013.

Note that the broadcasting station name, the tag, the broadcast start date/time, and the contract information included in the content information are used in content information extraction described below, and therefore, are also referred to as additional information. The additional information is included in the content information, and therefore, is also associated with the program identification information.

Process Performed by Reception Reservation System 1

FIG. 5 is a sequence chart illustrating a process performed by the reception reservation system 1 according to the first embodiment of the present disclosure. The process performed by the reception reservation system 1 will be described with reference to FIG. 5.

First, the operation signal accepting unit 16 of the television 10 accepts an operation signal requesting display of a trailer (step S1). The operation signal accepting unit 16 outputs the accepted operation signal to the request transmitting unit 15.

When the request transmitting unit 15 has received the operation signal requesting display of a trailer from the operation signal accepting unit 16, the request transmitting unit 15 transmits a request signal requesting display of a trailer to the server 20 (step S2).

The server reception unit 24 of the server 20 receives the request signal requesting display of a trailer, which has been transmitted from the television 10, via the server communication unit 21 (step S3). The server reception unit 24 outputs the received request signal to the content information management unit 25.

When the content information management unit 25 has received the request signal requesting display of a trailer from the server reception unit 24, the content information management unit 25 obtains one or more pieces of content information corresponding to the received request signal from the content information storage unit 26, and outputs the one or more pieces of content information to the program list generating unit 28. When the program list generating unit 28 has received the one or more pieces of content information from the content information management unit 25, the program list generating unit 28 makes a list that includes one or more pieces of program identification information included in the received one or more pieces of content information to thereby generate program list information. The program list generating unit 28 outputs the one or more pieces of content information and the generated program list information to the server transmission unit 27. The server transmission unit 27 transmits the one or more pieces of content information and the program list information received from the program list generating unit 28 to the television 10 via the server communication unit 21 (step S4).

The television reception unit 13 of the television 10 receives the one or more pieces of content information and the program list information transmitted from the server 20, via the television communication unit 11 (step S5). The television reception unit 13 outputs the received one or more pieces of content information and program list information to the display unit 14.

The display unit 14 displays a trailer including a program list on the display of the television 10 by referring to the received one or more pieces of content information and program list information (step S6).

The operation signal accepting unit 16 accepts an operation signal indicating selection of a piece of program identification information from among the one or more pieces of program identification information included in the program list displayed by the display unit 14 (step S7). The operation signal accepting unit 16 outputs the operation signal indicating selection of a piece of program identification information to the request transmitting unit 15.

When the request transmitting unit 15 has received the operation signal indicating selection of a piece of program identification information from the operation signal accepting unit 16, the request transmitting unit 15 transmits a signal that requests trailer content corresponding to the selected piece of program identification information to the server 20 via the television communication unit 11 (step S8).

The server reception unit 24 of the server 20 receives the signal that requests trailer content, which has been transmitted from the television 10, via the server communication unit 21 (step S9). The server reception unit 24 outputs the received signal to the trailer content transmitting unit 22.

The trailer content transmitting unit 22 obtains, from the trailer content storage unit 23, a piece of trailer content that is indicated by the signal received from the server reception unit 24. The trailer content transmitting unit 22 transmits the obtained piece of trailer content to the television 10 via the server communication unit 21 (step S10).

The television reception unit 13 of the television 10 receives the piece of trailer content transmitted from the server 20, via the television communication unit 11 (step S11). The television reception unit 13 outputs the received piece of trailer content to the display unit 14.

The display unit 14 displays the received piece of trailer content on the display of the television 10 (step S12).

The operation signal accepting unit 16 accepts an operation signal requesting reception of the broadcast program (step S13). The operation signal accepting unit 16 outputs the accepted operation signal to the reservation unit 18.

The reservation unit 18 reserves reception of the broadcast program in accordance with the received operation signal by referring to reception reservation information (step S14). At the start time of the broadcast program for which reception has been reserved, the reservation unit 18 performs reception of the broadcast program. In a case where the performed reception reservation is "viewing reservation", the reservation unit 18 outputs the received broadcast program to the display unit 14. In a case where the performed reception reservation is "recording reservation", the reservation unit 18 records the broadcast program to the HDD (not illustrated) externally connected to the television 10.

Examples of Screens Displayed on Television 10

Figure 6A:
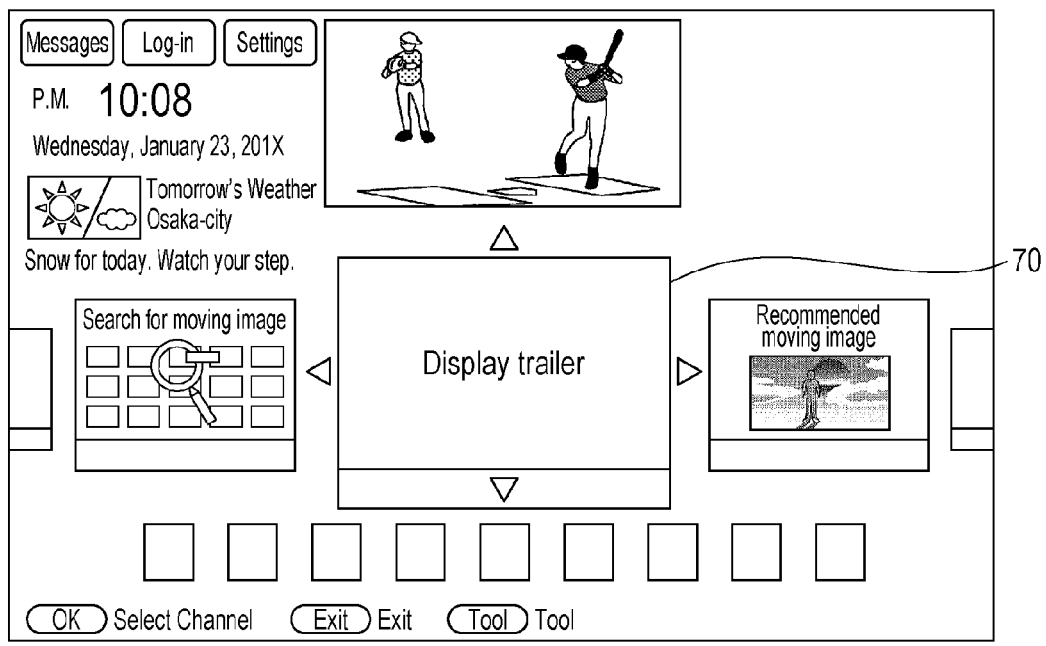
FIGS. 6A and 6B illustrate examples of screens that are displayed on a television and that accept an operation signal requesting display of a trailer, in the reception reservation system according to the first embodiment of the present disclosure.
Figure 6B:
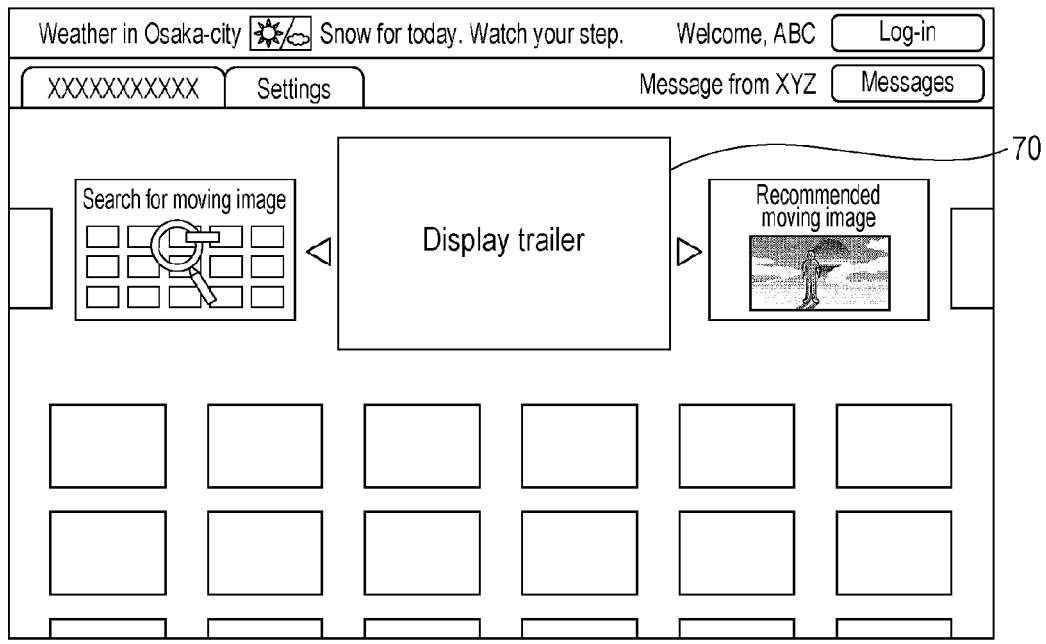

Example of screens displayed on the display of the television 10 by the display unit 14 in the process performed by the reception reservation system 1 will be described with reference to FIGS. 6A, 6B, 7A, and 7B. FIGS. 6A and 6B illustrate examples of screens that are displayed on the television 10 and that accept an operation signal requesting display of a trailer, in the reception reservation system 1 according to the first embodiment of the present disclosure. FIGS. 7A and 7B illustrate examples of trailers displayed on the display of the television 10 in the reception reservation system 1 according to the first embodiment of the present disclosure.

In step S1 described above, in a case where the operation signal accepting unit 16 accepts an operation signal requesting display of a trailer on a menu screen displayed on the television 10, for example, the display unit 14 displays a selection item 70 for displaying a trailer as one of the selection items that are displayed for using functions (input switching, listing display, and the like, for example) provided by the television 10, as illustrated in FIG. 6A. When a user has performed an operation of selecting the selection item 70 for displaying a trailer (when a user has moved the cursor to the selection item 70 for displaying a trailer by operating a remote controller, and has pressed the select button of the remote controller, for example), it may be assumed that the operation signal accepting unit 16 has accepted an operation signal requesting display of a trailer.

In a case where the operation signal accepting unit 16 accepts an operation signal requesting display of a trailer on an initial screen that is displayed when a user uses the Internet on the television 10, for example, the display unit 14 displays the selection item 70 for displaying a trailer as one of the selection items that indicate links, as illustrated in FIG. 6B. When a user has performed an operation of selecting the selection item 70 for displaying a trailer, it may be assumed that the operation signal accepting unit 16 has accepted an operation signal requesting display of a trailer.

Next, in step S6 described above, in a case where the display unit 14 displays a trailer screen 50 that provides previews of a plurality of broadcast programs broadcast by a specific broadcasting station, for example, the display unit 14 displays a program list 51 that includes pieces of program identification information that respectively identify the plurality of broadcast programs broadcast by the broadcasting station, as illustrated in FIG. 7A. In step S8, the request transmitting unit 15 transmits a signal that requests trailer content of a broadcast program identified by a piece of program identification information selected from the program list 51, to the server 20. When the television 10 has received the trailer content corresponding to the request signal in step S11, the television 10 may display the trailer content (trailer content 52) received from the server 20, as illustrated in FIG. 7A.

As illustrated in FIG. 7A, the display unit 14 may be configured to display the detailed indication 53 that includes the broadcast program name, the channel number, the broadcast start date/time, and the copyright indication included in the content information. Pieces of information included in the detailed indication 53 and displayed by the display unit 14 are not limited to the above-described pieces of information, and any information included in the content information may be included in the detailed indication 53 and displayed.

The display unit 14 may display buttons for referring to pieces of information included in the pieces of content information, extracting corresponding one or more pieces of content information, and displaying one or more pieces of program identification information in the extracted one or more pieces of content information in the program list 51. For example, the display unit 14 may display a recommend button 55 for extracting and displaying one or more pieces of content information that include the tag of "recommended", a don't-miss-it campaign button 56 for extracting and displaying one or more pieces of content information that include the tag of "don't-miss-it campaign", and a sport button 64 for extracting and displaying one or more pieces of content information that include the tag of "sport". The details of a case of referring to the tags and extracting one or more pieces of content information that include a tag of a corresponding type will be described in an embodiment below.

The display unit 14 may display the trailer screen 50 while including an advertisement 54 that encourages a user to subscribe to paid broadcast in the trailer screen 50 in addition to pieces of information in the content information.

Note that, in FIG. 7A, an example is illustrated where the program list 51 includes pieces of program identification information and pieces of trailer content of broadcast programs respectively identified by the pieces of program identification information; however, this embodiment is not limited to this example. The program list 51 may be configured not to include trailer content.

In a case where the program list 51 is configured to include trailer content, the television 10 transmits a signal that requests a trailer static image or a trailer moving image, which is trailer content, to a linked destination indicated by the trailer static image URL or the trailer moving image URL in the content information received in step S5, after the process in step S5. After the television 10 has received the requested trailer static image or trailer moving image, the process proceeds to step S6, and the television 10 displays the program list 51 that includes the trailer content on the display, as illustrated in FIG. 7A.

In step S6 described above, in a case where the display unit 14 displays the trailer screen 50 that provides previews of broadcast programs of a plurality of broadcasting stations, for example, the display unit 14 may display the program list 51 that includes pieces of program identification information which respectively identify broadcast programs of the plurality of broadcasting stations, as illustrated in FIG. 7B.

Process Performed by Reservation Unit 18 to Perform Reception Reservation

Figure 8:
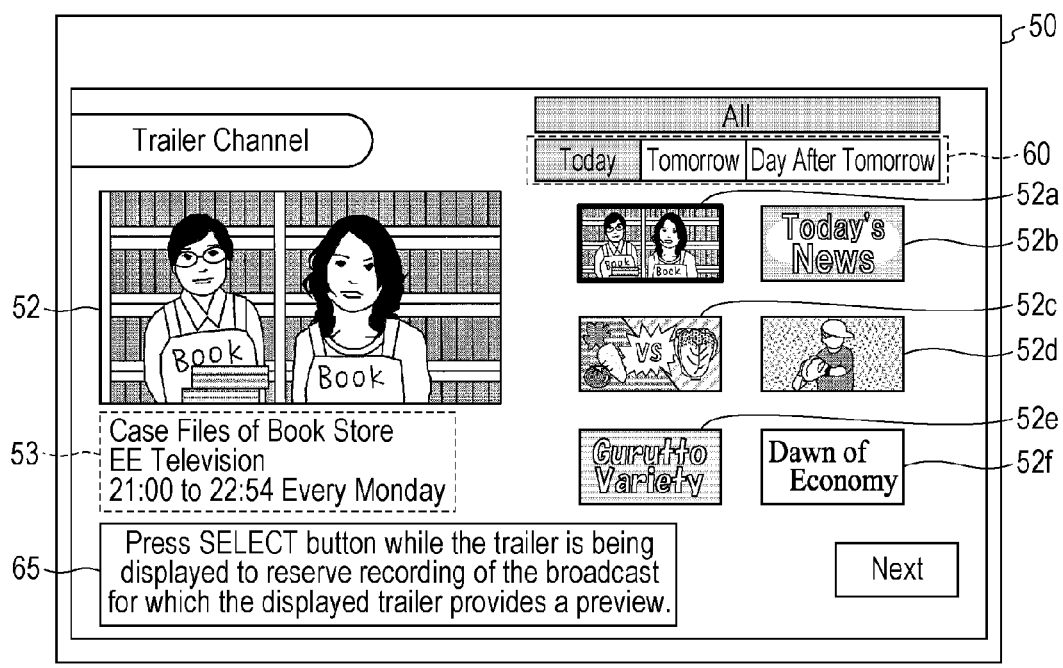
FIG. 8 illustrates another example of a trailer displayed on the display of the television in the reception reservation system according to the first embodiment of the present disclosure.
Figure 9:
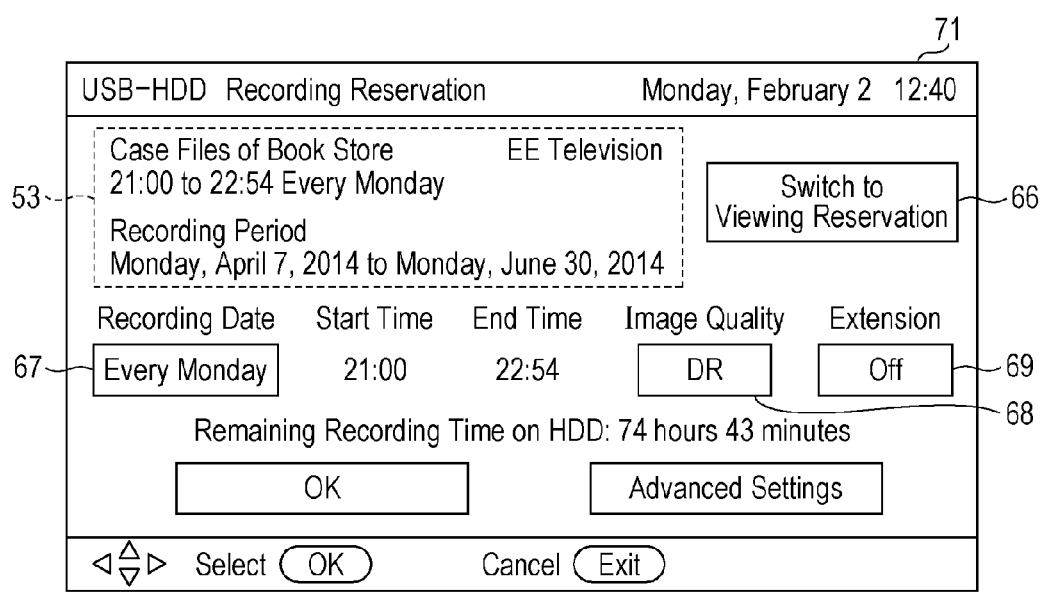
FIG. 9 illustrates an example of a reception reservation screen that appears after a transition from a trailer screen in the reception reservation system according to the first embodiment of the present disclosure.

An example where the reservation unit 18 reserves reception of a broadcast program in the process performed by the reception reservation system 1 will be described with reference to FIGS. 7A, 7B, 8, 9, 10A, and 10B. FIG. 8 illustrates another example of a trailer displayed on the display of the television 10 in the reception reservation system 1 according to the first embodiment of the present disclosure. FIG. 9 illustrates an example of a reception reservation screen that appears after a transition from the trailer screen 50 in the reception reservation system 1 according to the first embodiment of the present disclosure. FIGS. 10A and 10B illustrate examples of introductory trailer screens displayed on the display of the television 10 in the reception reservation system 1 according to the first embodiment of the present disclosure.

For example, in a case where the operation signal accepting unit (trailer content selecting unit) 16 has accepted an operation signal indicating selection of any piece of trailer content from among the pieces of trailer content included in the program list 51 while the display unit 14 is displaying the trailer screen 50 illustrated in FIG. 7A, the reservation unit 18 may reserve reception of a broadcast program for which the selected piece of trailer content provides a preview.

In a case where the operation signal accepting unit 16 has accepted an operation signal indicating selection of any piece of trailer content from among the pieces of trailer content included in the program list 51 while the display unit 14 is displaying the trailer screen 50 illustrated in FIG. 7B, the television 10 may display a program information button 57 for displaying more detailed program information, a viewing reservation button 58 for performing viewing reservation, and a recording reservation button 59 for performing recording reservation. In this case, the operation signal accepting unit 16 may accept an operation of selecting the viewing reservation button 58 or the recording reservation button 59 as an operation for reception reservation of a broadcast program performed in step S13 described above.

In a case where the display unit 14 displays the trailer screen 50 that does not include the program list 51 but includes a plurality of pieces of trailer content, namely, trailer content 52a to trailer content 52f, as illustrated in FIG. 8, the display unit 14 displays the trailer content 52a that is highlighted among the plurality of displayed pieces of trailer content, the trailer content 52a to the trailer content 52f, as the trailer content 52. A piece of trailer content to be highlighted is changed as follows. In a case where the operation signal accepting unit 16 accepts, from a user, an operation signal indicating a change in a piece of trailer content to be highlighted (in a case where a user presses a cursor key of the remote controller, for example), the display unit 14 changes the piece of trailer content to be highlighted to the indicated one. The display unit 14 displays the piece of trailer content now highlighted after the change as the trailer content 52. In FIG. 8, the display unit 14 may display static images from the trailer content 52a to the trailer content 52f, and may display a moving image of the highlighted trailer content 52a as the trailer content 52.

In the state illustrated in FIG. 8, in a case where the operation signal accepting unit 16 has accepted, from a user, an operation signal indicating selection of a piece of trailer content (in a case where a user has pressed the select button of the remote controller, for example), the reservation unit 18 may reserve reception of a broadcast program for which the selected piece of trailer content provides a preview. The display unit 14 may display a text 65 that informs a user of an operation for performing reception reservation, as illustrated in FIG. 8.

As described above, the television 10 may be configured to select, in a case where the television 10 has showed a user trailer content corresponding to a highlighted one and has accepted an instruction indicating selection of the highlighted trailer content (in a case where the user has pressed the select button, for example), the highlighted trailer content.

Note that the term "highlight" herein refers to an operation of simply highlighting a target, and is used as a term having a meaning different from the term "select".

Example of Reception Reservation Screen

In a case where the operation signal accepting unit 16 has accepted an operation signal indicating selection of any piece of trailer content from among the pieces of trailer content included in the program list 51, and has further accepted an operation signal indicating selection of the viewing reservation button 58 or the recording reservation button 59 that are displayed while the display unit 14 is displaying the trailer screen 50 illustrated in FIG. 7B, the display unit 14 may transition the display screen from the trailer screen 50 to a reception reservation screen 71 for the television 10 to accept viewing reservation and recording reservation, as illustrated in FIG. 9.

Note that the reception reservation screen 71 may include the detailed indication 53, a switch button 66 for switching from recording reservation to viewing reservation, a recording date button 67 for changing the recording date, and an image quality button 68 for selecting an image quality with which recording is performed. The reception reservation screen 71 may further include an extension button 69 for choosing, in a case where the broadcast start date/time or the broadcast end date/time of a broadcast program is changed, whether or not to automatically perform recording in accordance with the changed broadcast start date/time or the changed broadcast end date/time. The detailed indication 53, the recording date, the start time, and the end time included and displayed in the reception reservation screen 71 may be information included in the content information received by the television 10 or information obtained by the television 10 from an EPG.

Examples of image quality levels that can be selected by using the image quality button 68 are listed below but are not limited to these:

"DR" (also referred to as "standard") for recording a program with the same image quality as that of the broadcast program;

"Double" with which the recording time is approximately twice that of DR;

"Triple" with which the recording time is approximately three times that of DR; and "Fivefold" with which the recording time is approximately five times that of DR.

Note that the television 10 may be configured to enable selection of a higher number of image quality level steps between "DR" and "Fivefold". In this case, the image quality with which recording is to be performed may be determined by setting the size of moving image data obtained as a result of recording instead of the recording time relative to that of DR.

In a case where the operation signal accepting unit 16 has accepted, from a user, an operation signal indicating selection of a piece of trailer content (in a case where a user has pressed the select button of the remote controller, for example) while the display unit 14 is displaying the trailer screen 50 illustrated in FIG. 8, the display unit 14 may transition the display screen from the trailer screen 50 to the reception reservation screen 71, as illustrated in FIG. 9.

As described above, the screen on which the television 10 accepts reception reservation is not limited to the trailer screen 50, and the television 10 may be configured to accept reception reservation on a screen different form the trailer screen 50.

Example of Displaying Detailed Indication 53

In a case where the operation signal accepting unit 16 has accepted an operation signal indicating selection of any piece of trailer content from among the pieces of trailer content included in the program list 51, and has further accepted an operation signal indicating selection of the program information button 57 while the display unit 14 is displaying the trailer screen 50 illustrated in FIG. 7B, the television 10 may display the text of the introductory trailer message included in the piece of content information, in the detailed indication 53, as illustrated in FIG. 10B.

In a case where the operation signal accepting unit 16 has accepted, from a user, an operation signal indicating selection of a piece of trailer content (in a case where a user has pressed the select button of the remote controller, for example) while the display unit 14 is displaying the trailer screen 50 that includes the plurality of pieces of trailer content, the trailer content 52*a* to the trailer content 52*f*, without displaying the program list 51, as illustrated in FIG. 10A, the display unit 14 may display the detailed indication 53, as illustrated in FIG. 10B. Note that the display unit 14 may display a text 65*a* that informs a user of an operation for performing reception reservation, as illustrated in FIG. 10A.

In a case where the operation signal accepting unit 16 has accepted an operation signal indicating selection of the program information button 57, the television 10 may display a website of the broadcasting station which includes a text that introduces the broadcast program, or a site that announces the broadcast program. In this case, by replacing the introductory trailer message included in the piece of content information with the URL of the website of the broadcasting station or the site that announces the broadcast program, the television 10 is able to realize the above-described configuration.

As described above, the display unit 14 displays a plurality of pieces of trailer content, and the reservation unit 18 reserves reception of a broadcast program for which a piece of trailer content that has been selected provides a preview in a case where one or more predetermined conditions are satisfied. Here, the one or more predetermined conditions include a condition (also referred to as a condition A) that an operation signal indicating selection of any piece of trailer content has been accepted.

The one or more predetermined conditions may include a condition (also referred to as a condition B) that the operation signal accepting unit 16 has accepted an operation signal indicating selection of the viewing reservation button 58 or the recording reservation button 59, in addition to the condition A.

The one or more predetermined conditions may include a condition (also referred to as a condition C) that the operation signal accepting unit 16 has accepted an operation signal requesting reception of a broadcast program on a screen different from the trailer screen 50, in addition to the conditions A and B.

In a case where the operation signal accepting unit 16 has accepted again, while the trailer content 52 corresponding to a piece of program identification information selected from the program list 51 in FIG. 7A is being displayed, an operation of selecting the piece of program identification information, the operation signal accepting unit 16 may accept the operation as an operation for reserving reception of the broadcast program in step S13 described above.

In a case where the operation signal accepting unit 16 has accepted an operation signal indicating selection of the viewing reservation button 58 or the recording reservation button 59, the television 10 may reserve reception of the broadcast program a plurality of times. For example, by including an item of repeat reservation that indicates a plurality of times in the content information, the television 10 may perform reception reservation a number of times indicated by the repeat reservation. Examples of a plurality of times include "every month", "every Tuesday, total of 4 times", and "next occasion, hh:mm on MM/DD". In this way, the television 10 is able to reserve reception of a serial drama or a special, for example, which is broadcast over a plurality of days or a plurality of time periods by accepting a single operation signal. In this case, the television 10 may be configured to allow a user to choose to perform repeat reservation or once-off reservation. For example, the television 10 may display operation buttons for choosing whether or not to perform reception reservation a plurality of times, such as an "every time" button and a "this time only" button after the viewing reservation button 58 or the recording reservation button 59 has been selected.

Alternatively, repeat reservation may be implemented by making the content information include a plurality of pieces of reception reservation information for one piece of trailer information included therein. In a case of a one-hour serial drama that has 13 episodes and is broadcast from 21:00 every Tuesday, for example, the content information may include pieces of reception reservation information corresponding to the 13 episodes, for one piece of trailer information included therein, or the pieces of reception reservation information corresponding to the 13 episodes may be associated with the one piece of trailer information.

As described above, in the reception reservation system 1 according to this embodiment, the television 10 is able to receive trailer content at a timing that a user desires, the trailer content being the content that is allowed to be transmitted by the server 20 at the desired timing, and to display the trailer content. The television 10 is able to reserve reception of a broadcast program for which the displayed trailer content provides a preview. Furthermore, the television 10 is able to simultaneously indicate a plurality of broadcast programs for which reception can be reserved and to make a user select a broadcast program for which reception is to be reserved. Accordingly, the television 10 is able to show a user trailer content at a timing that the user desires and to reserve reception of a broadcast program associated with the trailer content.

Note that this embodiment has a configuration in which the television 10 transmits a signal that requests trailer content corresponding to a selected piece of program identification information to the server 20 in step S8, and the server 20 transmits the trailer content to the television 10 in step S10. However, the present disclosure is not limited to this configuration. For example, the server 20 may be configured to transmit, when transmitting pieces of content information and program list information in step S4, pieces of trailer content associated with the program list information. In doing so, it is possible to display a trailer screen on which any of the pieces of trailer content is displayed, which makes it possible to easily draw users' attention. Furthermore, the number of times communication is performed between the television 10 and the server 20 decreases, and therefore, it is possible to reduce the processing loads on the television 10 and the server 20.

The server 20 may be constituted by a plurality of servers. For example, the server 20 may be constituted by a server A that includes the server communication unit 21, the trailer content transmitting unit 22, the trailer content storage unit 23, and the server reception unit 24, and a server B that includes the server communication unit 21, the server reception unit 24, the content information management unit 25, the content information storage unit 26, the server transmission unit 27, and the program list generating unit 28. Note the server A and the server B may be managed by different operators respectively.

In a case where the server 20 is constituted by the server A and the server B, the television 10 is configured to receive content information and program list information from the server B, and receive trailer content from the server A. It is possible to implement this configuration by setting the server A as linked destinations indicated by the trailer static image URL and the trailer moving image URL included in the trailer information.

A configuration in which the server 20 includes any unit of the television 10 and a configuration in which the television 10 includes any unit of the server 20 may be employed. For example, a configuration may be employed in which the television 10 includes the program list generating unit 28 and receives pieces of content information from the server 20, and the program list generating unit 28 included in the television 10 generates a program list from the received pieces of content information.

As described above, the units included in the television 10 and the server 20 need not be configured as illustrated in the block diagram in FIG. 1. It is possible to implement the reception reservation system 1 by appropriately combining the units.

Hardware Configuration of Reception Reservation System 1

FIG. 11 is a block diagram schematically illustrating a hardware configuration of the reception reservation system 1 according to the first embodiment of the present disclosure.

Hardware Configuration of Television 10

As illustrated in FIG. 11, the television 10 includes a communication unit 110, a control unit 120, a storage unit 130, a broadcast program receiving unit 140, a display unit 170, and an operation unit 180.

The communication unit 110 is an interface for enabling communication with external devices, and is provided in order to implement the function of the television communication unit 11. The communication unit 110 is implemented by using a local area network (LAN) terminal to which a LAN cable is connected, and a wireless LAN interface. The communication unit 110 may be implemented on the basis of High Definition Multimedia Interface (HDMI) (registered trademark).

Examples of a device that is usable as the control unit 120 include a central processing unit (CPU). The storage unit 130 includes a main memory and an auxiliary memory. Examples of a device that is usable as the main memory of the storage unit 130 include a semiconductor random access memory (RAM). Examples of a device that is usable as the auxiliary memory of the storage unit 130 include an HDD.

In the auxiliary memory of the storage unit 130, a control program for operating the television 10 is stored. The control program is a program for implementing the function of the television control unit 12 described above. In the auxiliary memory of the storage unit 130, it is possible to store broadcast programs received by the television 10. The auxiliary memory that stores broadcast programs received by the television 10 therein need not be integrated into the television 10, and may be an HDD that is externally connected to the television 10 via Universal Serial Bus (USB).

The control unit 120 loads the control program into the main memory of the storage unit 130, and executes various instructions included in the loaded control program to thereby implement the function of the television control unit 12 described above.

The broadcast program receiving unit 140 is an apparatus that receives broadcast programs that are broadcast. Examples of a device that is usable as the broadcast program receiving unit 140 include a tuner.

The display unit 170 is an apparatus that displays images represented by image signals output from the control unit 120. The display unit 170 is implemented by using a transmissive liquid crystal panel having a backlight or an organic electroluminescence (EL) display, for example.

The operation unit 180 is a user interface (UI) for accepting user operations input to the television 10. Examples of a device that is usable as the operation unit 180 include hardware keys, switches, and the like.

Hardware Configuration of Server 20

As illustrated in FIG. 11, the server 20 includes a communication unit 210, a control unit 220, and a storage unit 230.

The communication unit 210 is an interface for connecting the server 20 with the television 10 so as to enable communication with the television 10 over the network 2 (including a communication network 201). The communication unit 210 is implemented by using a LAN terminal to which a LAN cable is connected, and a wireless LAN interface.

Examples of a device that is usable as the control unit 220 include a CPU. The storage unit 230 includes a main memory and an auxiliary memory. Examples of a device that is usable as the main memory of the storage unit 230 include a semiconductor RAM. Examples of a device that is usable as the auxiliary memory of the storage unit 230 include an HDD.

In the auxiliary memory of the storage unit 230, a control program for operating the server 20 is stored. The control program is a program for implementing the function of the server control unit 29 described above.

The control unit 220 loads the control program into the main memory of the storage unit 230, and executes various instructions included in the loaded control program to thereby implement the function of the server control unit 29 described above.

Second Embodiment

Figure 13:
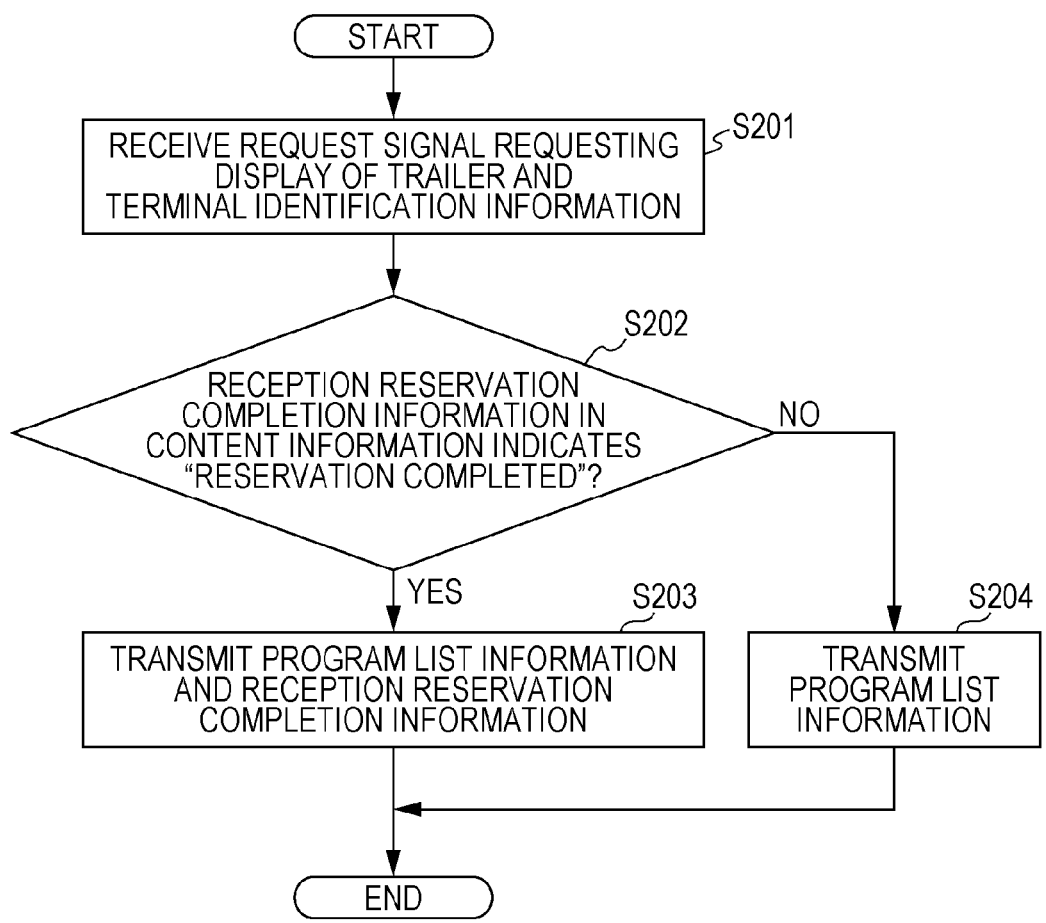
FIG. 13 is a flowchart illustrating a flow of a process performed by a server to transmit reception reservation completion information in the reception reservation system according to the second embodiment of the present disclosure.

Description of another embodiment of the present disclosure will be given below with reference to FIGS. 12 and 13.

In a case where program identification information corresponding to a broadcast program for which reception has been reserved is included in a program list to be displayed by the television 10, the program identification information corresponding to a broadcast program for which reception has been reserved may indicate that reception has been reserved for the broadcast program.

FIG. 12 is a sequence chart illustrating a process performed by the reception reservation system 1 according to a second embodiment of the present disclosure. The process in steps S1 to S14 is similar to the process described in the first embodiment, and therefore, description thereof will be omitted. It is assumed that the content information stored in the content information storage unit 26 includes reception reservation completion information indicating whether or not reception has been reserved and a terminal ID that identifies a terminal in addition to the items illustrated in FIG. 3.

The reservation unit 18 outputs information indicating a broadcast program for which reception has been reserved to the reservation completion information transmitting unit 17. The reservation completion information transmitting unit 17 transmits, to the server 20 via the television communication unit 11, reservation completion information indicating that reception has been reserved for the broadcast program indicated by the information received from the reservation unit 18, and terminal identification information that identifies the television 10 (step S21).

The server reception unit 24 of the server 20 receives the reservation completion information and the terminal identification information transmitted by the television 10, via the server communication unit 21 (step S22). The server reception unit 24 outputs the received reservation completion information and terminal identification information to the content information management unit 25.

When the content information management unit 25 has received the reservation completion information and the terminal identification information from the server reception unit 24, the content information management unit 25 obtains a piece of content information corresponding to the broadcast program indicated by the reservation completion information, from the content information storage unit 26. The content information management unit 25 sets "reservation completed", which indicates that reception has been reserved, as the reception reservation completion information in the obtained piece of content information. The content information management unit 25 further sets the received terminal identification information as the terminal ID, and stores the piece of content information after the setting in the content information storage unit 26 to thereby update the piece of content information (step S23).

Flow of Process for Transmitting Reception Reservation Completion Information

Next, a flow of a process for the server 20 to transmit reception reservation completion information will be described with reference to FIG. 13. FIG. 13 is a flowchart illustrating a flow of a process performed by the server 20 to transmit reception reservation completion information in the reception reservation system 1 according to the second embodiment of the present disclosure.

After the server 20 has performed the process illustrated in FIG. 12, the server 20 receives a request signal requesting display of a trailer and terminal identification information transmitted from the television 10, via the server communication unit 21 (step S201). The server reception unit 24 outputs the received request signal and terminal identification information to the content information management unit 25.

When the content information management unit 25 has received the request signal requesting display of a trailer and the terminal identification information from the server reception unit 24, the content information management unit 25 obtains, from the content information storage unit 26, a piece of content information corresponding to the received request signal and terminal identification information. The content information management unit 25 determines whether or not the reception reservation completion information in the obtained piece of content information indicates "reservation completed" (step S202).

If it is determined in step S202 that the reception reservation completion information in the obtained piece of content information indicates "reservation completed" (Yes in step S202), the content information management unit 25 outputs the obtained piece of content information and the reception reservation completion information indicating "reservation completed" to the program list generating unit 28. When the program list generating unit 28 has received the piece of content information from the content information management unit 25, the program list generating unit 28 makes a list that includes program identification information included in the received piece of content information to thereby generate program list information. The program list generating unit 28 outputs the generated program list information and the received reception reservation completion information to the server transmission unit 27. The server transmission unit 27 transmits the program list information and the reception reservation completion information received from the program list generating unit 28 to the television 10 via the server communication unit 21 (step S203).

On the other hand, if it is determined in step S202 that the reception reservation completion information in the obtained piece of content information does not indicate "reservation completed" (No in step S202), the content information management unit 25 outputs the obtained piece of content information to the program list generating unit 28. When the program list generating unit 28 has received the piece of content information from the content information management unit 25, the program list generating unit 28 makes a list that includes program identification information included in the received piece of content information to thereby generate program list information. The program list generating unit 28 outputs the generated program list information to the server transmission unit 27. The server transmission unit 27 transmits the program list information received from the program list generating unit 28 to the television 10 via the server communication unit 21 (step S204).

Note that, in steps S203 and S204, the server transmission unit 27 may be configured to extract trailer information from the received piece of content information and output the trailer information.

As described above, in the reception reservation system 1 according to this embodiment, the television 10 transmits, to the server 20, reservation completion information indicating that reception has been reserved for a broadcast program, and terminal identification information that identifies the terminal. When the server 20 has received the reservation completion information and the terminal identification information, the server 20 updates the piece of content information corresponding to the broadcast program indicated by the reservation completion information. Accordingly, the television 10 is able to determine whether or not reception has been reserved for a broadcast program corresponding to a piece of program identification information included in the program list, by referring to the received reception reservation completion information and program list information. The television 10 is able to display a text ("viewing reservation completed", "recording reservation completed", or the like, for example) or an icon indicating that reception has been reserved.

Note that the television 10 is also able to determine, on its own, whether or not reception has been reserved for a broadcast program. Therefore, the content information may be configured not to include the reception reservation completion information. In this case, the television 10 may display a text or an icon indicating that reception has been reserved for a broadcast program when displaying the program list. In this case, when the television 10 displays again trailer content of the broadcast program for which reception has been reserved, the viewing reservation button 58 and the recording reservation button 59 may be grayed out so as to indicate that these buttons are not selectable.

Third Embodiment

Description of another embodiment of the present disclosure will be given below with reference to FIGS. 14, 15A, 15B, 16A, and 16B.

As described in the above-described embodiment while referring to FIG. 7A, the display unit 14 may display a program list that includes one or more pieces of program identification information associated with additional information that satisfies a specific condition. The flow of a process performed by the television 10 to extract one or more pieces of program identification information will be described with reference to FIG. 14.

Flow of Process for Extracting Program Identification Information

Figure 14:
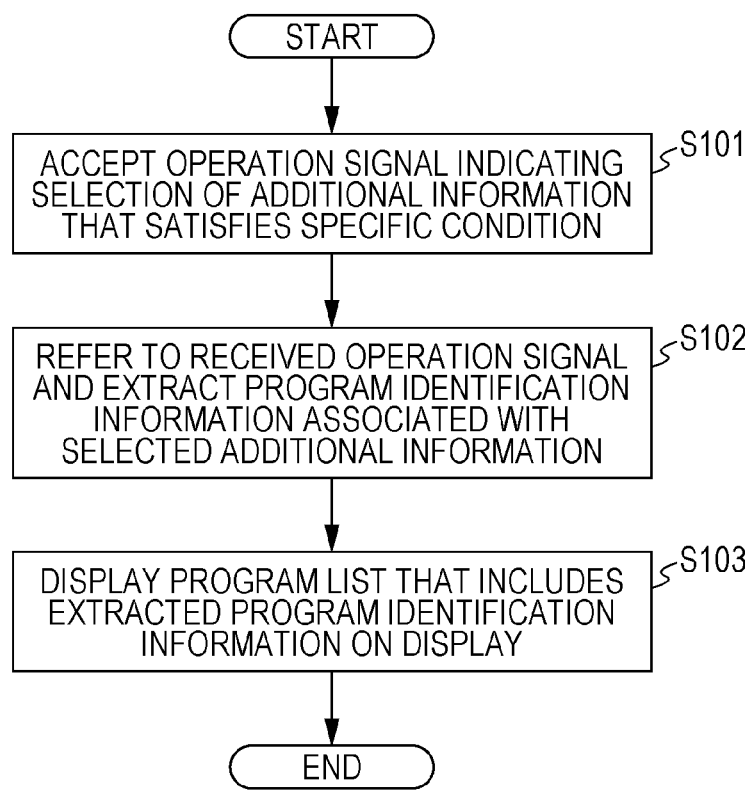
FIG. 14 is a flowchart illustrating a flow of a process performed by the television to display a program list including extracted pieces of program identification information, in the reception reservation system according to a third embodiment of the present disclosure.

FIG. 14 is a flowchart illustrating a flow of a process performed by the television 10 to display a program list including extracted pieces of program identification information, in the reception reservation system 1 according to a third embodiment of the present disclosure.

The operation signal accepting unit 16 accepts an operation signal indicating selection of additional information that satisfies a specific condition (step S101), and outputs the operation signal to the display unit 14.

The display unit 14 refers to the received operation signal and extracts one or more pieces of program identification information associated with the selected additional information (step S102).

The display unit 14 displays a program list that includes the extracted one or more pieces of program identification information on the display of the television 10 (step S103).

Examples of Displayed Screens

As illustrated in FIG. 7B, for example, the display unit 14 displays a day button 60 for extracting one or more pieces of content information that include "today" as the broadcast start date/time, for extracting one or more pieces of content information that include "tomorrow" as the broadcast start date/time, or for extracting one or more pieces of content information that include "the day after tomorrow" as the broadcast start date/time. In this configuration, in a case where a user has selected "Today" on the day button 60, for example, the display unit 14 extracts one or more pieces of program identification information that include "today" as the broadcast start date/time, which is additional information. The display unit 14 may display a program list that includes the extracted one or more pieces of program identification information.

As illustrated in FIG. 7B, for example, the display unit 14 displays a broadcasting station button 61 for extracting and displaying one or more pieces of content information that include a corresponding broadcasting station name. In this configuration, in a case where a user has selected "AA Television" on the broadcasting station button 61, for example, the display unit 14 extracts one or more pieces of program identification information that include "AA Television" as the broadcasting station name, which is additional information. The display unit 14 may display a program list that includes the extracted one or more pieces of program identification information.

Figure 15A:
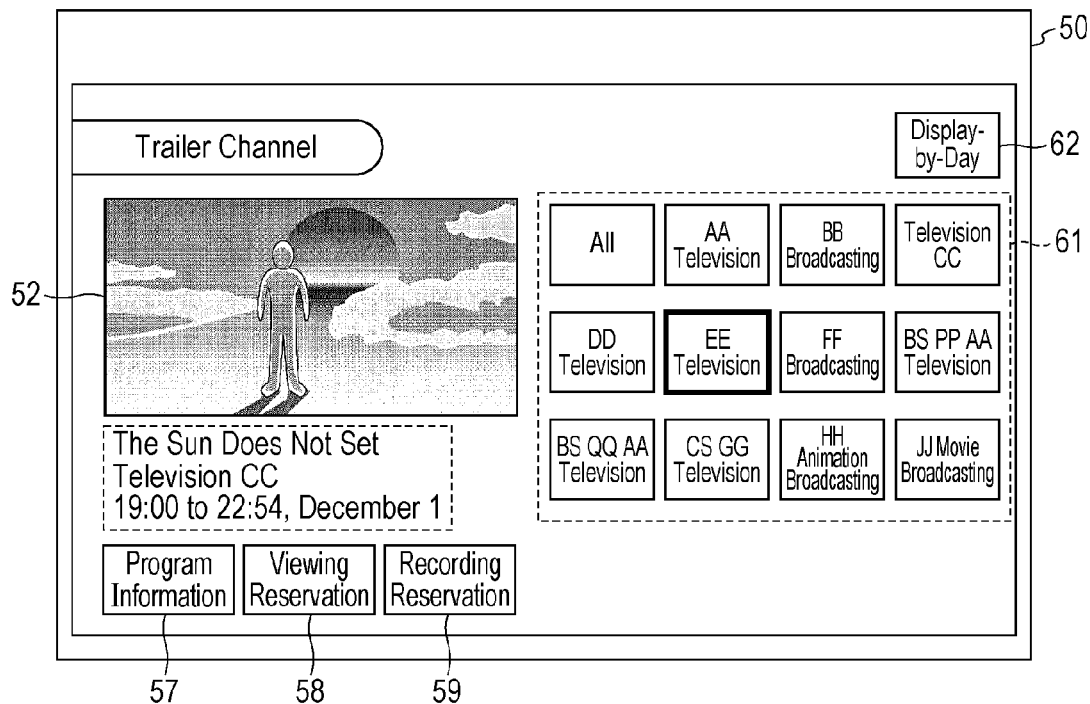
FIGS. 15A and 15B illustrate examples of the trailer screen displayed on the display of the television in the reception reservation system according to the third embodiment of the present disclosure.
Figure 15B:
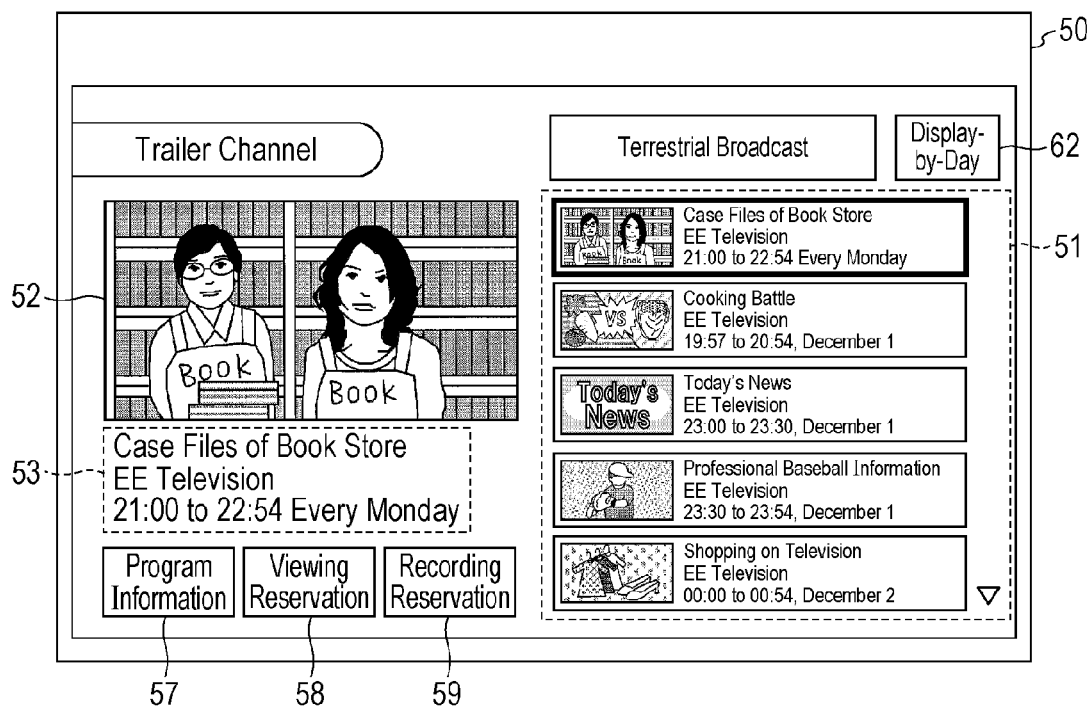
Figure 16A:
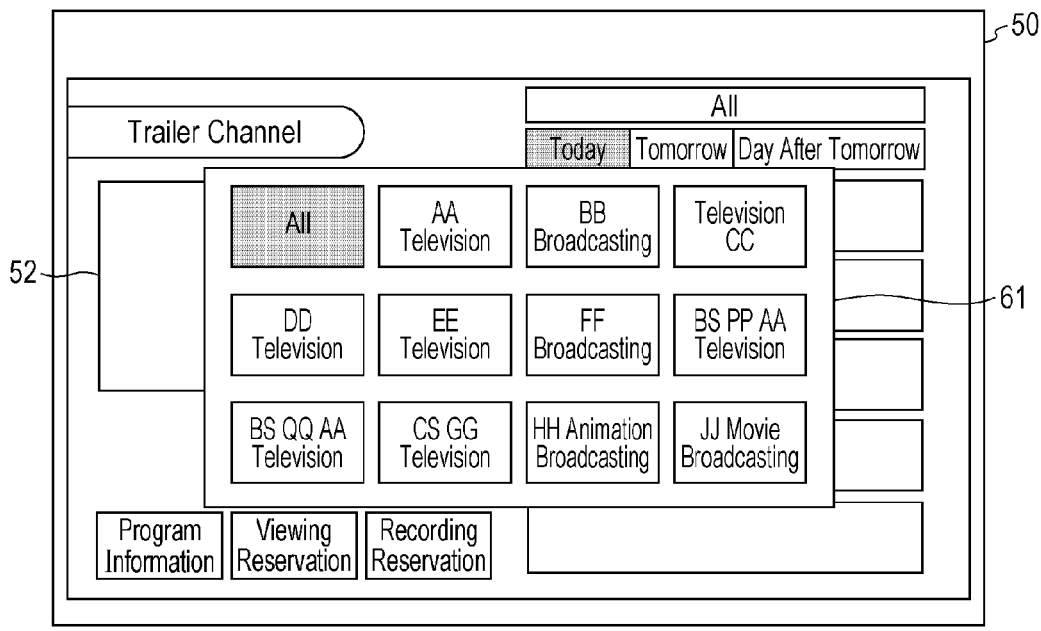
FIGS. 16A and 16B illustrate other examples of the trailer screen displayed on the display of the television in the reception reservation system according to the third embodiment of the present disclosure.
Figure 16B:
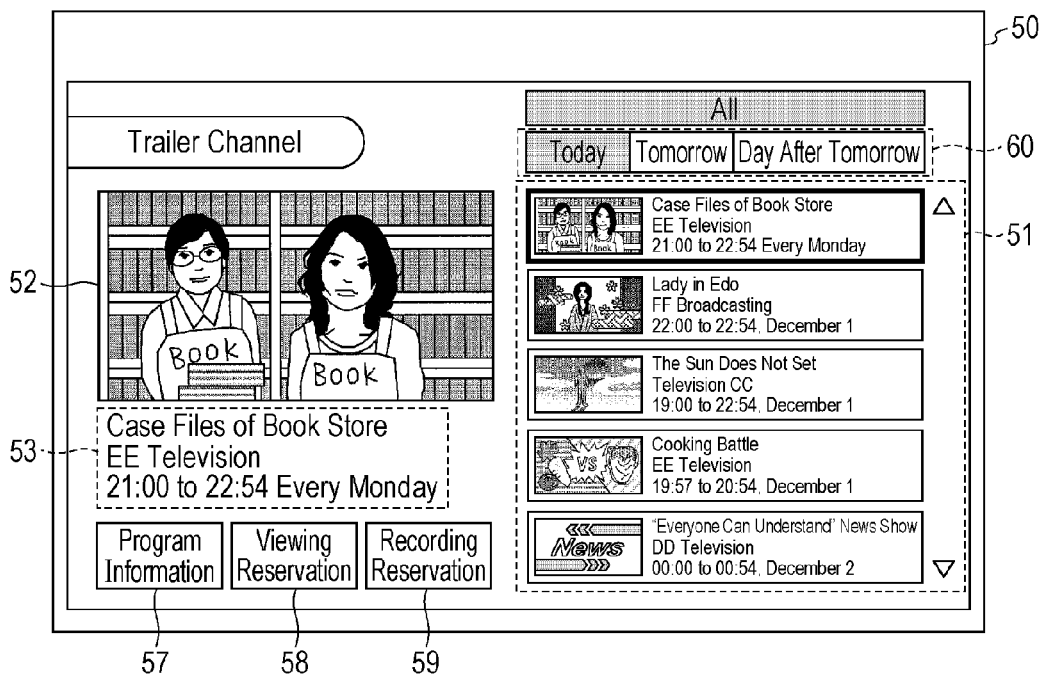

Examples of other screens will be described with reference to FIGS. 15A, 15B, 16A, and 16B. FIGS. 15A and 15B illustrate examples of the trailer screen 50 displayed on the display of the television 10 in the reception reservation system 1 according to the third embodiment of the present disclosure. FIGS. 16A and 16B illustrate other examples of the trailer screen 50 displayed on the display of the television 10 in the reception reservation system 1 according to the third embodiment of the present disclosure.

As illustrated in FIG. 15A, for example, the display unit 14 displays, on the trailer screen 50, the broadcasting station button 61 that includes selection items for selection from among broadcasting stations, broadcast programs of which can be displayed by the television 10. In a case where the operation signal accepting unit 16 has accepted an operation signal indicating selection of "EE Television", the operation signal accepting unit 16 outputs the operation signal to the display unit 14. The display unit 14 extracts pieces of content information that include "EE Television" as the broadcasting station name, selection of which is indicated by the operation signal. The display unit 14 displays, on the trailer screen 50, the program list 51 that includes pieces of program identification information in the extracted pieces of content information, as illustrated in FIG. 15B. In this case, a display-by-day button 62 for displaying the day button 60 that includes selection items for making a viewer select a day may be displayed on the trailer screen 50.

As illustrated in FIG. 16A, for example, the broadcasting station button 61 may be displayed when the trailer screen 50 is displayed. In a case where the operation signal accepting unit 16 has accepted an operation signal indicating that "All" has been selected, the display unit 14 does not perform extraction of content information, and displays the program list 51 that includes pieces of program identification information corresponding to broadcast programs of all broadcasting stations, as illustrated in FIG. 16B.

As described above, in the reception reservation system 1 according to this embodiment, the television 10 extracts one or more pieces of program identification information associated with additional information that satisfies a specific condition selected by a viewer, and displays a program list that includes the extracted one or more pieces of program identification information. Accordingly, the television 10 is able to display a trailer that meets a user's preference.

The extraction process may be performed by the server 20. For example, in the process (before step S4) in which the content information management unit 25 obtains pieces of content information from the content information storage unit 26, the content information management unit 25 may obtain pieces of content information from the content information storage unit 26 by referring to the reception reservation completion information and the terminal ID described in the second embodiment. For example, the server 20 may receive terminal identification information from a broadcast receiving terminal that has transmitted a request signal requesting display of a trailer, and the content information management unit 25 may obtain, from the content information storage unit 26, pieces of content information which include the received terminal identification information and which include "reservation completed" as the reception reservation completion information. In a case where many pieces of content information among the obtained pieces of content information include the tag of a specific genre, the content information management unit 25 may obtain the pieces of content information that include the tag of the specific genre from the content information storage unit 26.

Fourth Embodiment

Description of another embodiment of the present disclosure will be given below with reference to FIGS. 17A and 17B.

Figure 17A:
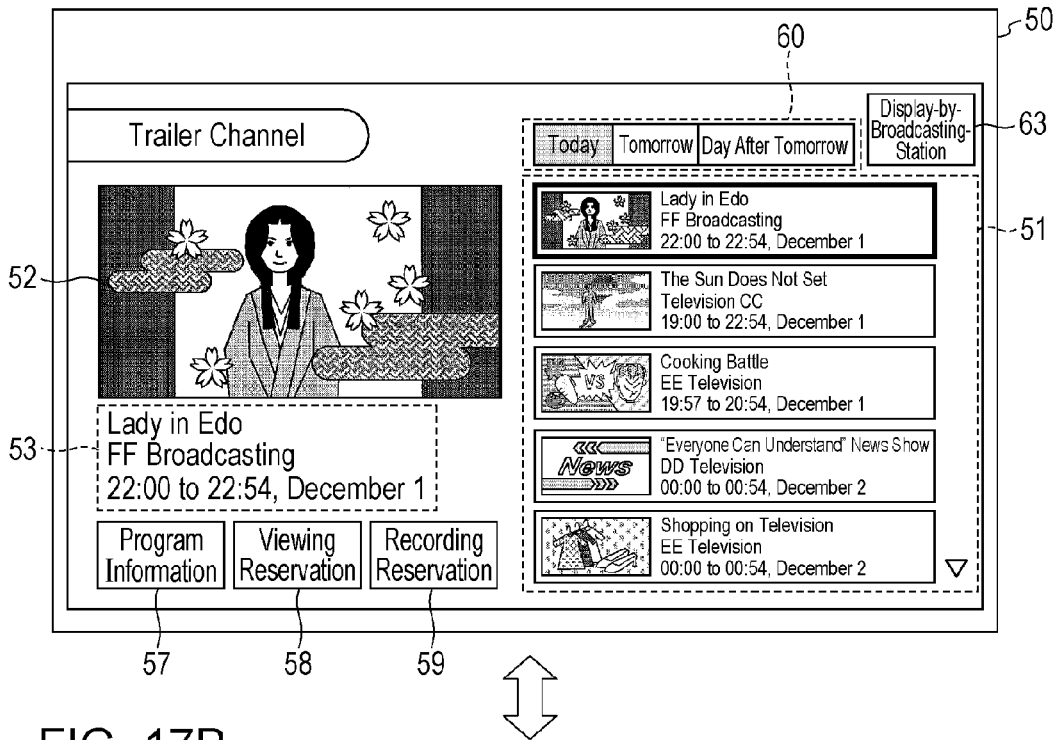
FIGS. 17A and 17B illustrate examples of the trailer screen displayed on the display of the television in the reception reservation system according to a fourth embodiment of the present disclosure.
Figure 17B:
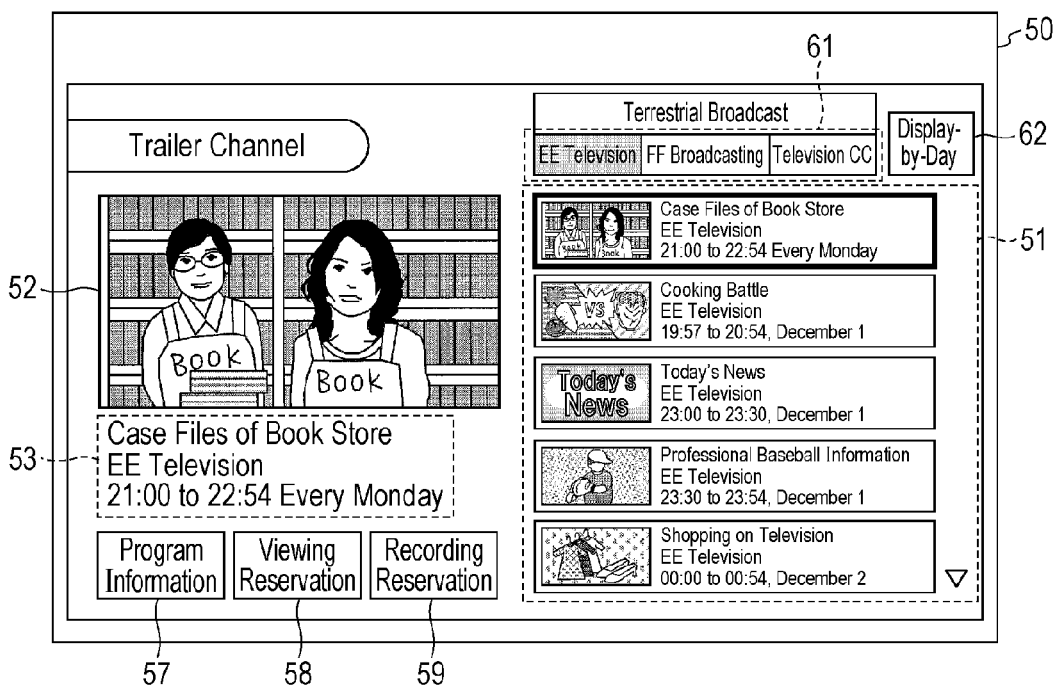

FIGS. 17A and 17B illustrate examples of the trailer screen 50 displayed on the display of the television 10 in the reception reservation system 1 according to a fourth embodiment of the present disclosure.

As illustrated in FIG. 17A, the television 10 may display a display-by-broadcasting-station button 63 for displaying the broadcasting station button 61 that includes selection items for making a user select a broadcasting station. In a case where the operation signal accepting unit 16 has accepted an operation signal indicating that the display-by-broadcasting-station button 63 has been selected on the trailer screen 50 illustrated in FIG. 17A, the display unit 14 displays the broadcasting station button 61, as illustrated in FIG. 17B. In a case where the operation signal accepting unit 16 has accepted an operation signal indicating that the display-by-day button 62 has been selected on the trailer screen 50 illustrated in FIG. 17B, the display unit 14 displays the day button 60, as illustrated in FIG. 17A.

As described above, in the reception reservation system 1 according to this embodiment, the television 10 displays, on the trailer screen 50, buttons for making a viewer select additional information that is used in extraction of pieces of content information. Accordingly, the television 10 is able to display a trailer that meets the viewer's preference.

Fifth Embodiment

Description of another embodiment of the present disclosure will be given below.

In the above-described embodiments, a request signal requesting display of a trailer is transmitted from the television 10 to the server 20. However, the server 20 may be configured to transmit one or more pieces of content information and program list information to the television 10 without receiving, from the television 10, a request signal requesting display of a trailer.

For example, it is assumed that the server 20 transmits one or more pieces of content information and program list information to the television 10 after a predetermined time has passed (for example, one hour, one day, one week, or the like). In this case, the television 10 may be configured to display the trailer screen 50 in the area of the selection item 70 for displaying a trailer when displaying the menu screen illustrated in FIG. 6A, for example. In this case, the server 20 may refer to the reception reservation information and the terminal identification information described above to thereby determine one or more pieces of content information and program list information to be transmitted to a terminal identified by the terminal identification information. As a method for the server 20 to determine one or more pieces of content information and program list information to be transmitted, methods described below are conceivable, for example, in a case where the terminal has reserved reception of a broadcast program of a specific broadcasting station: (1) a method in which more pieces of content information corresponding to broadcast programs of the specific broadcasting station are transmitted than pieces of content information corresponding to other broadcasting stations; and (2) a method in which program list information that includes pieces of program identification information corresponding to broadcast programs of the specific broadcasting station is transmitted.

As described above, in the reception reservation system 1 according to this embodiment, the server 20 transmits one or more pieces of content information and program list information by referring to broadcast programs for which reception has been reserved by a viewer of the television 10. Accordingly, the television 10 is able to display a trailer that is more suitable to the viewer's preference.

Sixth Embodiment

Description of another embodiment of the present disclosure will be given below with reference to FIGS. 18A and 18B.

Figure 18A:
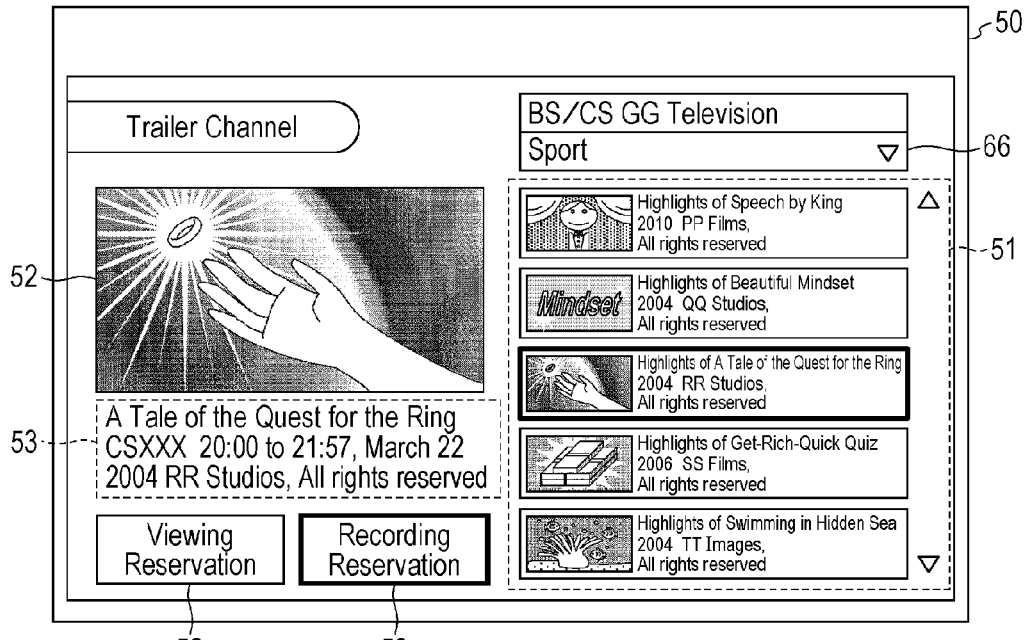
FIGS. 18A and 18B illustrate examples of the trailer screen displayed on the display of the television in the reception reservation system according to a sixth embodiment of the present disclosure.
Figure 18B:
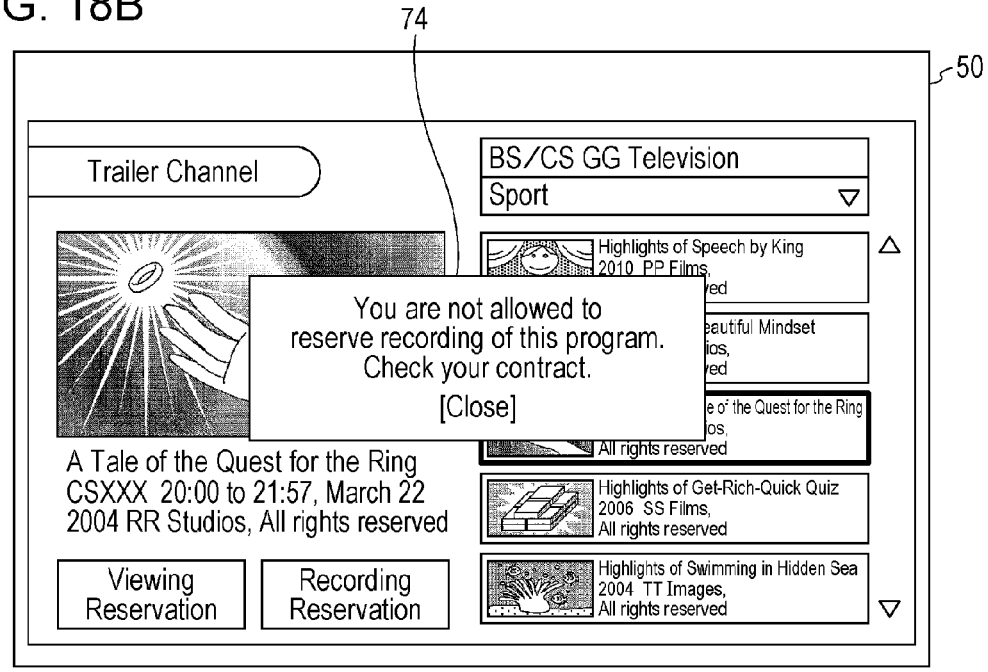

FIGS. 18A and 18B illustrate examples of the trailer screen 50 displayed on the display of the television 10 in the reception reservation system 1 according to a sixth embodiment of the present disclosure.

In a case where the operation signal accepting unit 16 has accepted an operation signal indicating that the recording reservation button 59 has been selected on the trailer screen 50 illustrated in FIG. 18A, the display unit 14 refers to the contract information in a piece of content information corresponding to a broadcast program identified by a piece of program identification information that has been selected. In a case where the contract information indicates a contract that does not allow viewing of the broadcast program identified by the selected piece of program identification information, the display unit 14 displays a text 74 indicating that recording reservation of the broadcast program is not allowed due to settings of the television 10, as illustrated in FIG. 18B.

As described above, in the reception reservation system 1 according to this embodiment, the television 10 determines whether or not viewing of a broadcast program corresponding to a displayed piece of content information is allowed, by referring to the contract information included in the piece of content information. Accordingly, the television 10 is able to inform a viewer that it is not allowed to perform viewing reservation or recording reservation of a broadcast program that is not allowed to be viewed. Furthermore, the television 10 is able to refrain from performing viewing reservation or recording reservation of a broadcast program that is not allowed to be viewed.

Seventh Embodiment

Description of another embodiment of the present disclosure will be given below with reference to FIGS. 19 to 24.

Figure 19:
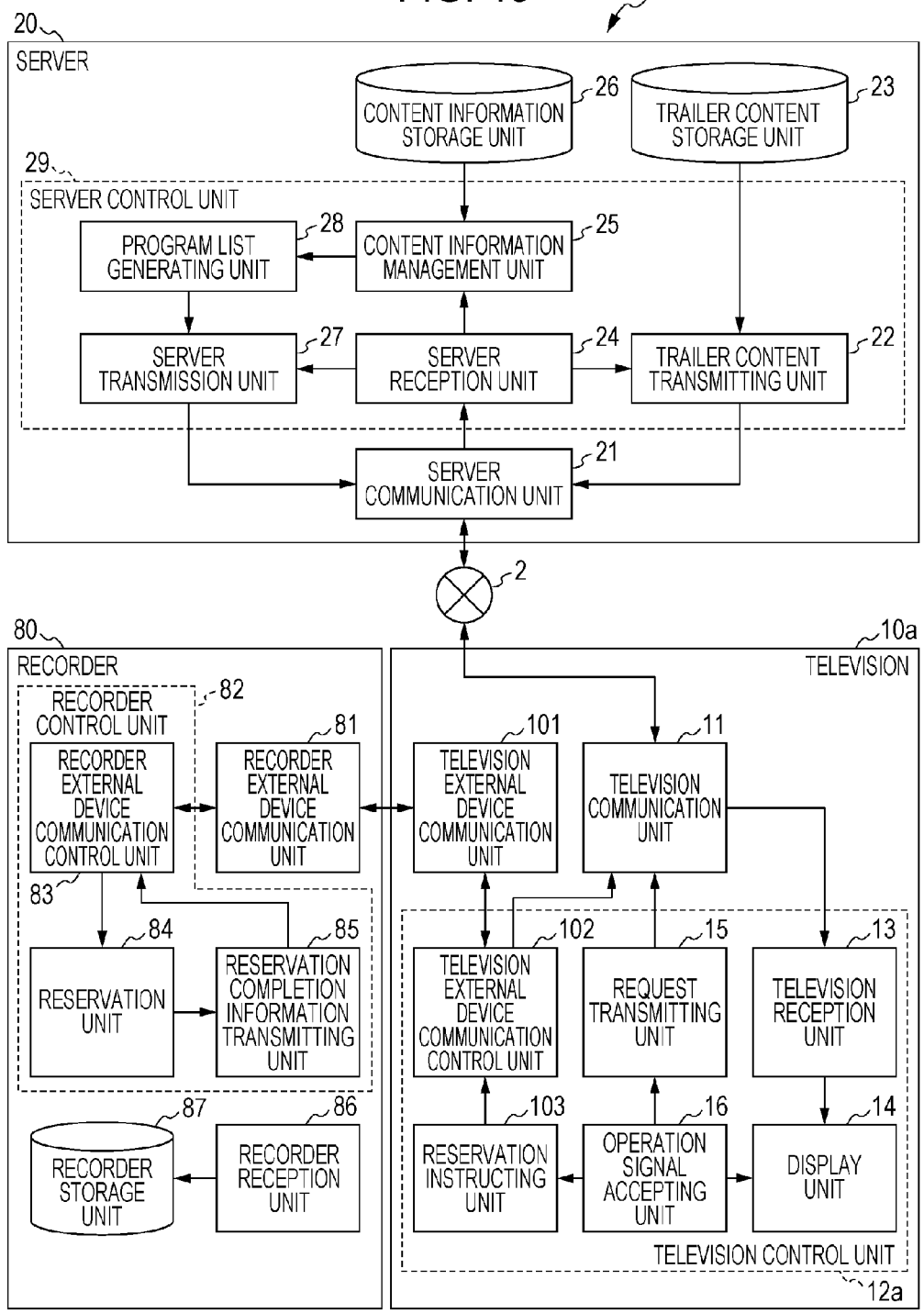
FIG. 19 is a block diagram illustrating a configuration of a reception reservation system according to a seventh embodiment of the present disclosure.
Figure 20:
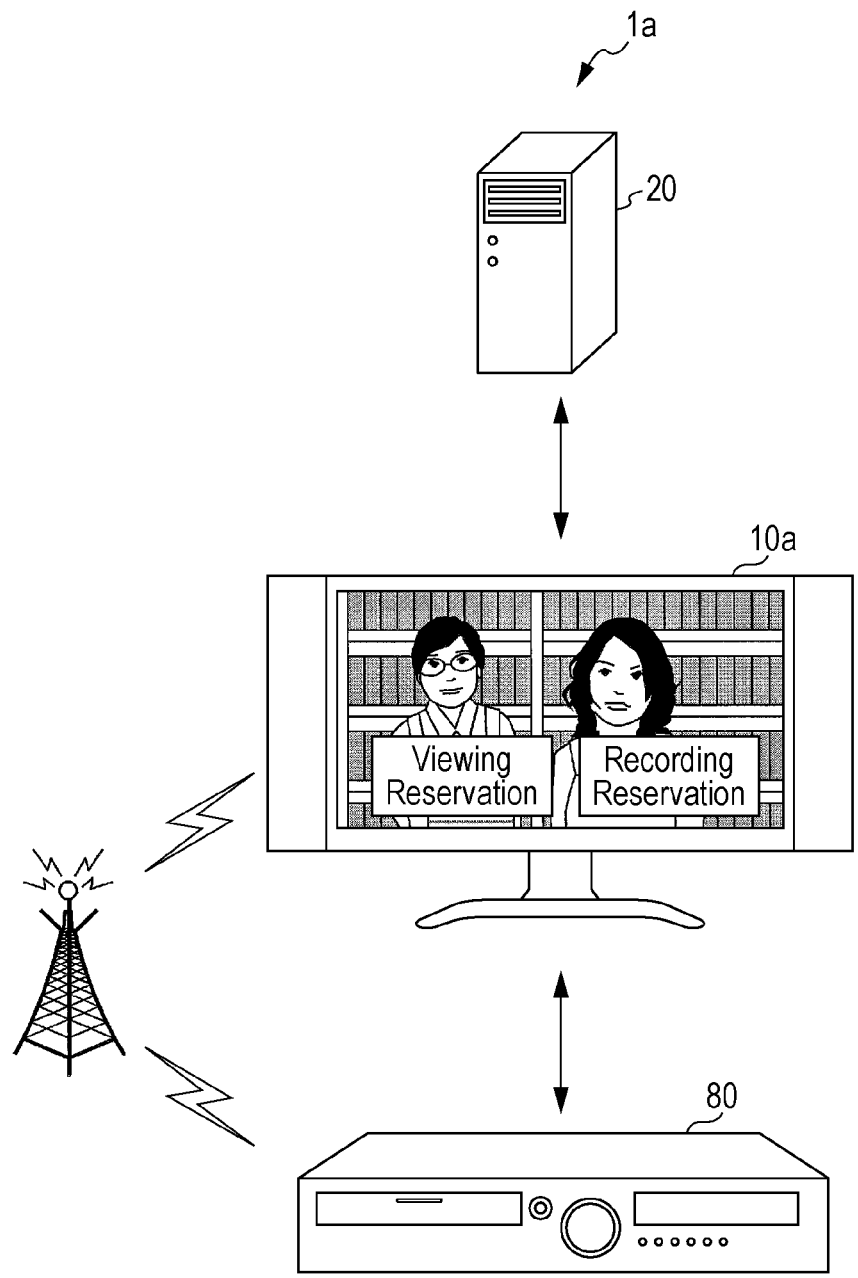
FIG. 20 is a diagram schematically illustrating the reception reservation system according to the seventh embodiment of the present disclosure.

FIG. 20 is a diagram schematically illustrating a reception reservation system 1a according to a seventh embodiment of the present disclosure. As illustrated in FIG. 20, the reception reservation system 1a is constituted by the server 20, a television 10a, and a recorder 80. The configurations of the server 20, the television 10a, and the recorder 80 that constitute the reception reservation system 1a will be described in detail with reference to FIG. 19.

FIG. 19 is a block diagram illustrating a configuration of the reception reservation system 1a according to the seventh embodiment of the present disclosure. In the reception reservation system 1a, the server 20 has the same configuration as the first embodiment described above, and therefore, description thereof will be omitted. In the reception reservation system 1a, the server 20 transmits (delivers) trailer content of a broadcast program to be received by the television 10a to the television 10a over the network 2, and the television 10a displays the received trailer content on the display. The television 10a accepts reception reservation of the broadcast program and transmits a control signal for controlling the recorder 80 to thereby instruct the recorder 80 to reserve reception of the broadcast program.

Configuration of Television 10a

The television 10a includes a television external device communication unit 101 in addition to the units included in the television 10 in the first embodiment. The television 10a further includes a television control unit 12a instead of the television control unit 12 in the first embodiment.

The television external device communication unit 101 has a function that enables transmission/reception of data to/from the recorder 80. The function of the television external device communication unit 101 is implemented by the communication unit 110 in the hardware configuration illustrated in FIG. 11 described above.

The television control unit 12a includes and functions as a television external device communication control unit 102 and a reservation instructing unit (reception reservation instructing unit) 103 instead of the reservation completion information transmitting unit 17 and the reservation unit 18 in the television control unit 12 in the first embodiment. The functions of the television control unit 12a are implemented by the control unit 120 in the hardware configuration illustrated in FIG. 11 described above.

The television external device communication control unit 102 controls communication that is performed via the television external device communication unit 101.

The reservation instructing unit 103 provides, in a case where the reservation instructing unit 103 has received an operation signal requesting reception of a broadcast program, a reception reservation instruction for reserving reception of the broadcast program, to the recorder 80.

Configuration of Recorder 80

The recorder 80 includes a recorder external device communication unit 81, a recorder control unit 82, a recorder reception unit 86, and a recorder storage unit 87, as illustrated in FIG. 19.

The recorder external device communication unit 81 has a function that enables transmission/reception of data to/from the television 10a. The interface of the recorder external device communication unit 81 is based on HDMI, for example.

The recorder reception unit 86 is able to receive broadcast programs via broadcast waves. At the start time of a broadcast program for which reception has been reserved by a reservation unit 84, which will be described below, the recorder reception unit 86 receives the broadcast program and outputs the received broadcast program to the recorder storage unit 87.

The recorder storage unit 87 stores data of the broadcast program received from the recorder reception unit 86 therein.

The recorder control unit 82 performs overall control of each unit in the recorder 80. The recorder control unit 82 will be described in detail below.

Recorder Control Unit 82

The recorder control unit 82 also functions as a recorder external device communication control unit (reception reservation accepting unit) 83, the reservation unit 84, and a reservation completion information transmitting unit 85.

The recorder external device communication control unit 83 controls communication performed via the recorder external device communication unit 81.

The reservation unit 84 reserves, in a case where the reservation unit 84 has accepted a reception reservation instruction for receiving a broadcast program, reception of the broadcast program. The reservation unit 84 performs reception reservation by referring to reception reservation information that is received when accepting the reception reservation instruction. The reservation unit 84 may alternatively use an EPG.

The reservation completion information transmitting unit 85 outputs, in a case where the recorder 80 has reserved reception of a broadcast program, reservation completion information indicating that reception has been reserved for the broadcast program.

Process Performed by Reception Reservation System 1a

FIG. 21 is a sequence chart illustrating a process performed by the reception reservation system 1a according to the seventh embodiment of the present disclosure. The process performed by the reception reservation system 1a will be described with reference to FIG. 21.

The process from step S1 in which the television 10a accepts an operation signal requesting display of a trailer to step S13 in which the television 10a accepts an operation signal requesting reception of a broadcast program is the same as the above-described embodiment, and therefore, description thereof will be omitted.

When the operation signal accepting unit 16 has accepted an operation signal requesting reception of a broadcast program in step S13, the display unit 14 displays a screen for prompting a user to specify an apparatus that is to perform recording, that is, to select the television or the recorder. An example of a screen displayed by the display unit 14 in this case is illustrated in FIG. 22A.

Figure 22A:
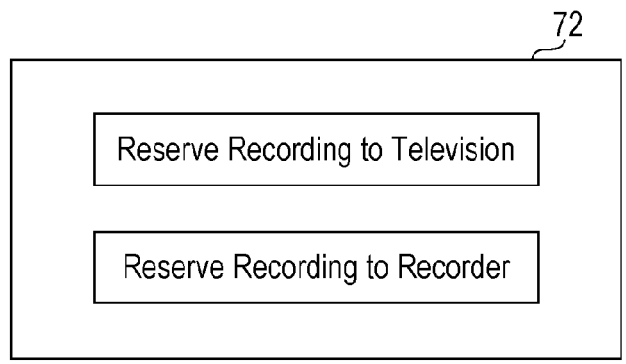
FIG. 22A illustrates an example of a selection screen for selecting a device that performs reception reservation.

FIG. 22A illustrates an example of a selection screen for selecting a device that performs reception reservation in the reception reservation system 1a according to the seventh embodiment of the present disclosure. The display unit 14 displays a selection screen 72 for prompting a user to specify an apparatus that is to perform recording, that is, to select the television or the recorder in step S31, as illustrated in FIG. 22A. Note that the selection screen 72 need not be displayed instead of the trailer screen 50. An image for prompting a user to specify an apparatus that is to perform recording, that is, to select the television or the recorder, may be superimposed and displayed on the trailer screen 50 illustrated in FIG. 7A or 7B or the trailer screen 50 illustrated in FIG. 16A or 16B, for example. In a case where the television 10a does hot have a recording function, the display unit 14 may be configured not to display the selection screen 72 for prompting a user to specify an apparatus that is to perform recording, that is, to select the television or the recorder.

When the operation signal accepting unit 16 has accepted an operation signal indicating that the recorder has been selected as an apparatus that is to perform recording (step S31), the operation signal accepting unit 16 outputs the operation signal to the reservation instructing unit 103.

When the reservation instructing unit 103 has received the operation signal indicating that the recorder has been selected as an apparatus that is to perform recording, the reservation instructing unit 103 provides a reception reservation instruction for reserving reception of the broadcast program, to the television external device communication control unit 102. At this time, the reservation instructing unit 103 outputs the reception reservation information included in the piece of content information to the television external device communication control unit 102. When the television external device communication control unit 102 has accepted the reception reservation instruction, the television external device communication control unit 102 provides a reception reservation instruction to the recorder 80 via the television external device communication unit 101 (step S32). The television 10a performs input switching of the television 10a in order to display an image to be output by the recorder 80. Note that the television 10a may be configured to provide a reception reservation instruction and to output a signal for performing control so as to make the recorder 80 enter a state where the recorder 80 is able to accept the reception reservation instruction, in step S32. For example, in a case where the recorder 80 is not able to accept a reception reservation instruction because the power of the recorder 80 is turned off, the television 10a may provide a reception reservation instruction and also output a control signal for turning on the power of the recorder 80. When the recorder 80 has received the control signal, the recorder 80 turns on the power thereof and enters the state where the recorder 80 is able to accept the reception reservation instruction.

The recorder external device communication control unit 83 accepts the reception reservation instruction from the television 10a via the recorder external device communication unit 81 (step S33). The recorder external device communication control unit 83 provides a reception reservation instruction to the reservation unit 84.

Figure 22B:
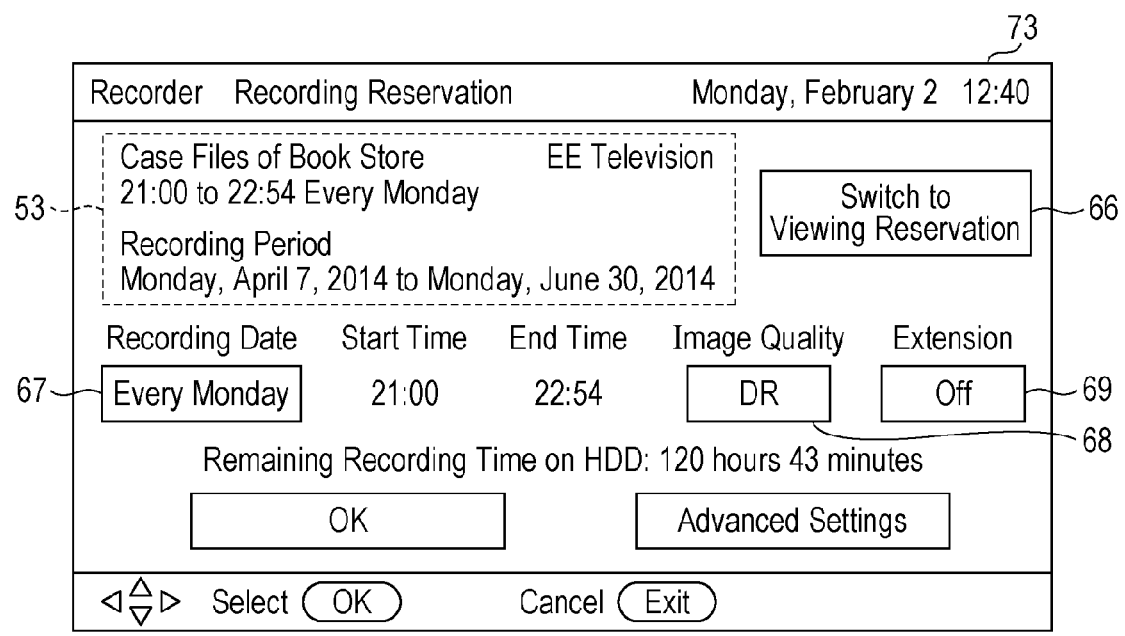
FIG. 22B illustrates an example of a recording reservation screen for a recorder to perform recording reservation, in the reception reservation system according to the seventh embodiment of the present disclosure.

When the reservation unit 84 has accepted the reception reservation instruction from the recorder external device communication control unit 83, the reservation unit 84 reserves reception of the broadcast program by referring to the reception reservation information received together with the reception reservation instruction (step S34). In step S34, the display unit 14 displays a recording reservation screen 73 that is a screen output by the recorder 80 and that is a screen for the recorder 80 to perform recording reservation, as illustrated in FIG. 22B. The recording reservation screen 73 output by the recorder 80 may be configured to include the detailed indication 53, the switch button 66, the recording date button 67, the image quality button 68, and the extension button 69 similarly to the reception reservation screen 71 described with reference to FIG. 9. The operation signal accepting unit 16 of the television 10a may be configured to accept an operation performed by a user on the recording reservation screen 73 output by the recorder 80. For example, when a user operates the remote controller of the television 10a, the operation signal accepting unit 16 accepts the operation, and the television 10a transmits a control signal indicating the accepted operation to the recorder 80. The recorder 80 performs an operation in accordance with the control signal transmitted from the television 10a. In this way, a user is able to control the recorder 80 by operating the remote controller of the television 10a.

Next, the reservation unit 84 outputs information indicating the broadcast program for which reception has been reserved to the reservation completion information transmitting unit 85. The reservation completion information transmitting unit 85 outputs reservation completion information indicating that reception has been reserved for the broadcast program indicated by the information received from the reservation unit 84, and terminal identification information that identifies the recorder 80, to the recorder external device communication control unit 83. The recorder external device communication control unit 83 transmits the received reservation completion information and terminal identification information, via the recorder external device communication unit 81 (step S35).

The television external device communication control unit 102 receives the reservation completion information and the terminal identification information via the television external device communication unit 101 (step S36). When the television external device communication control unit 102 has received the reservation completion information and the terminal identification information, the television 10a may determine that reception has been reserved by the recorder 80, perform input switching, and display the trailer screen 50.

The television external device communication control unit 102 transmits the received reservation completion information and terminal identification information to the server 20 via the television communication unit 11 (step S37).

The server reception unit 24 receives the reservation completion information and the terminal identification information that have been transmitted by the television 10a, via the server communication unit 21 (step S38). The server reception unit 24 outputs the received reservation completion information and terminal identification information to the content information management unit 25.

When the content information management unit 25 has received the reservation completion information and the terminal identification information from the server reception unit 24, the content information management unit 25 obtains a piece of content information corresponding to the broadcast program indicated by the reservation completion information, from the content information storage unit 26. The content information management unit 25 sets "reservation completed", which indicates that reception has been reserved, as the reception reservation completion information in the obtained piece of content information, sets the received terminal identification information as the terminal ID, and stores the updated piece of content information in the content information storage unit 26 (step S39).

Note that, in a case where the recorder 80 is configured to be capable of transmitting data to the server 20 over the network 2, the recorder 80 may transmit the reservation completion information and the terminal identification information to the server 20 in step S35.

Figures 23, 24:
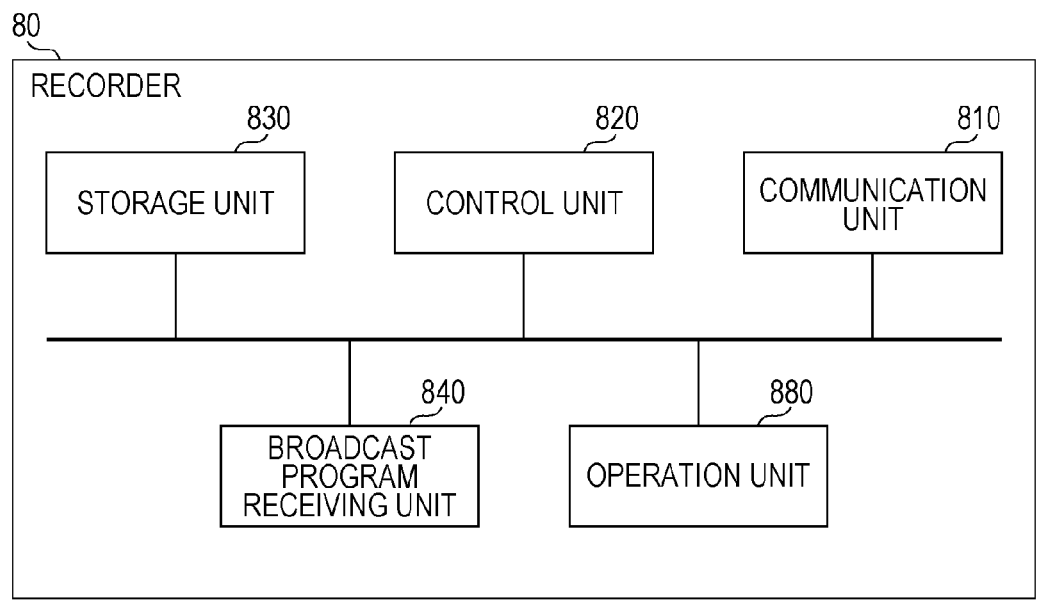
FIG. 23 is a diagram illustrating a device correspondence table stored in a content information storage unit in the reception reservation system according to the seventh embodiment of the present disclosure.
FIG. 24 is a block diagram schematically illustrating a hardware configuration of the recorder in the seventh embodiment of the present disclosure.

Method for Indicating Reception Reservation Device that has Reserved Reception of Broadcast Program Next, a method for the display unit 14 to indicate, in a case where a piece of content information is to be transmitted again after the piece of content information has been updated in step S39 described above, that the recorder 80 has reserved reception of a broadcast program corresponding to the piece of content information will be described with reference to FIG. 23. FIG. 23 is a diagram illustrating a device correspondence table stored in the content information storage unit 26 in the reception reservation system 1a according to the seventh embodiment of the present disclosure.

First, the device correspondence table illustrated in FIG. 23 is set in advance in the content information storage unit 26. In the device correspondence table, each row includes a trailer content receiving device ID that identifies a device which receives trailer content and a plurality of reception reservation device IDs that respectively identify a plurality of reception reservation devices.

For example, in a case where a device that receives trailer content is a television having an ID "03D0311", and the same device, that is, the television having the ID "03D0311" performs recording, "03D0311" is set in advance as the trailer content receiving device ID, and "03D0311" is also set in advance as a reception reservation device ID 1, as illustrated in the second row of the device correspondence table in FIG. 23.

In a case where a device that receives trailer content is a television having an ID "A8F133", and a device that performs recording is a recorder having an ID "1023975G", "A8F133" is set in advance as the trailer content receiving device ID, and "1023975G" is set in advance as the reception reservation device ID 1, as illustrated in the third row of the device correspondence table in FIG. 23.

In a case where a device that receives trailer content is a television having an ID "0xD-0045", and devices that perform recording are a television having an ID "04F0079" and a recorder having an ID "8575593384", "0xD-0045" is set as the trailer content receiving device ID, "04F0079" is set as the reception reservation device ID 1, and "8575593384" is set as a reception reservation device ID 2, as illustrated in the fourth row of the device correspondence table in FIG. 23.

In a case where the server 20 transmits a piece of content information to the television 10a in step S4 described above, the content information management unit 25 refers to the reception reservation completion information included in the piece of content information that has been obtained. Next, in a case where the reception reservation completion information referred to by the content information management unit 25 indicates "reservation completed", the content information management unit 25 refers to the terminal ID included in the obtained piece of content information. Subsequently, the content information management unit 25 determines whether or not the terminal ID referred to matches a reception reservation device ID set in the device correspondence table.

If the content information management unit 25 has determined that the terminal ID referred to matches a reception reservation device ID set in the device correspondence table, the content information management unit 25 determines whether or not the trailer content receiving device ID corresponding to the reception reservation device ID matches the terminal ID of a trailer content receiving device (the television 10a in this embodiment) that has requested the piece of content information.

If the content information management unit 25 has determined that the trailer content receiving device ID corresponding to the reception reservation device ID matches the terminal ID of the trailer content receiving device (the television 10a in this embodiment) that has requested the piece of content information, the content information management unit 25 outputs, to the program list generating unit 28, information indicating that reception has been reserved for a broadcast program corresponding to the piece of content information together with the piece of content information.

On the other hand, if the content information management unit 25 has determined that the terminal ID referred to does not match any reception reservation device ID set in the device correspondence table, or if the content information management unit 25 has determined that the trailer content receiving device ID corresponding to the reception reservation device ID does not match the terminal ID of the trailer content receiving device (the television 10a in this embodiment) that has requested the piece of content information, the content information management unit 25 determines that reception has not been reserved for the broadcast program corresponding to the piece of content information by using the terminal ID referred to, and outputs the piece of content information to the program list generating unit 28.

As described above, in the reception reservation system 1a according to this embodiment, even if a device that receives and displays content information (the television 10a in this embodiment) is different from a device that reserves reception of a corresponding broadcast program (the recorder 80 in this embodiment), it is possible to show a user trailer content at a timing that the user desires, and to reserve reception of a broadcast program associated with the trailer content. The television 10a is able to determine whether or not reception has been reserved for a broadcast program corresponding to a piece of program identification information included in the program list, by referring to the received piece of content information and program list information. Furthermore, the television 10a is able to display a text ("viewing reservation completed" or "recording reservation completed", for example) or an icon indicating that reception has been reserved.

Note that the device correspondence table may be configured to include labels that respectively correspond to trailer content receiving device IDs and reception reservation device IDs and that indicate respective devices. For example, in FIG. 23, "television" is set in the device correspondence table as a label that corresponds to the trailer content receiving device ID "03D0311". Similarly, "recorder" is set in the device correspondence table as a label that corresponds to the reception reservation device ID 1 "04F0079". In doing so, the television 10a is able to display a text indicating that reception has been reserved, and to indicate a device that has reserved reception. That is, even in a case where a plurality of reception reservation devices are set in a row of the device correspondence table in the reception reservation system 1a, the television 10a is able to indicate a reception reservation device that has reserved reception. Note that examples of labels to be assigned to devices include "television", "USB-HDD", "HDD recorder", "Blu-ray recorder", and "smartphone".

The server 20 may manage the device correspondence table on a per user basis. For example, in a case where the device correspondence table illustrated in FIG. 23 corresponds to one user, the device correspondence table indicates that the user owns three devices that are able to receive trailer content. In this state, it is assumed that a piece of trailer content is received by the device having the ID "0xD-0045", reception of a broadcast program corresponding to the piece of trailer content is reserved by the device having the ID "04F0079", and thereafter, the piece of trailer content corresponding to the broadcast program is displayed by the device having the ID "03D0311". In this case, the device having the ID "04F0079" that has reserved reception does not correspond to the device having the ID "03D0311" that receives the piece of trailer content in the device correspondence table; however, the users of the devices are the same. Therefore, the device having the ID "03D0311" is able to indicate that reception has been reserved by the device having the ID "04F0079" for the broadcast program corresponding to the piece of trailer content. That is, in the reception reservation system 1a, even in a case where a user owns a plurality of devices that are able to receive trailer content, and different reception reservation devices are respectively set as the devices that are able to receive trailer content in the device correspondence table, it is possible to indicate, in trailer content of a broadcast program for which the user has reserved reception, that reception has been reserved, in the reception reservation system 1a.

Note that the description has been given of an example where the server 20 manages IDs of recorders as reception reservation device IDs, and IDs of televisions as trailer content receiving device IDs; however, this example is not intended to limit the disclosure described herein. As illustrated in an eighth embodiment described below, the server 20 may manage IDs of televisions as reception reservation device IDs, and IDs of smartphones as trailer content receiving device IDs, for example.

Hardware Configuration of Recorder 80

FIG. 24 is a block diagram schematically illustrating a hardware configuration of the recorder 80 in the seventh embodiment of the present disclosure. As illustrated in FIG. 24, the recorder 80 includes a communication unit 810, a control unit 820, a storage unit 830, a broadcast program receiving unit 840, and an operation unit 880.

The communication unit 810 is an interface for enabling communication with external devices, and implements the function of the recorder external device communication unit 81. The communication unit 810 is implemented by using a LAN terminal to which a LAN cable is connected, and a wireless LAN interface. The communication unit 810 may be implemented on the basis of HDMI.

Examples of a device that is usable as the control unit 820 include a CPU. The storage unit 830 includes a main memory and an auxiliary memory. Examples of a device that is usable as the main memory of the storage unit 830 include a semiconductor RAM. Examples of a device that is usable as the auxiliary memory of the storage unit 830 include an HDD, which implements the function of the recorder storage unit 87.

In the auxiliary memory of the storage unit 830, a control program for operating the recorder 80 is stored. The control program is a program for implementing the function of the recorder control unit 82 described above. In the auxiliary memory of the storage unit 830, it is also possible to store broadcast programs received by the recorder 80.

The control unit 820 loads the control program into the main memory of the storage unit 830, and executes various instructions included in the loaded control program to thereby implement the function of the recorder control unit 82 described above.

The broadcast program receiving unit 840 is an apparatus that receives broadcast programs which are broadcast, and implements the function of the recorder reception unit 86. Examples of a device that is usable as the broadcast program receiving unit 840 include a tuner.

The operation unit 880 is a UI for accepting user operations input to the recorder 80. Examples of a device that is usable as the operation unit 880 include hardware keys, switches, and the like.

Eighth Embodiment

Description of another embodiment of the present disclosure will be given below with reference to FIGS. 25 to 29.

Figure 25:
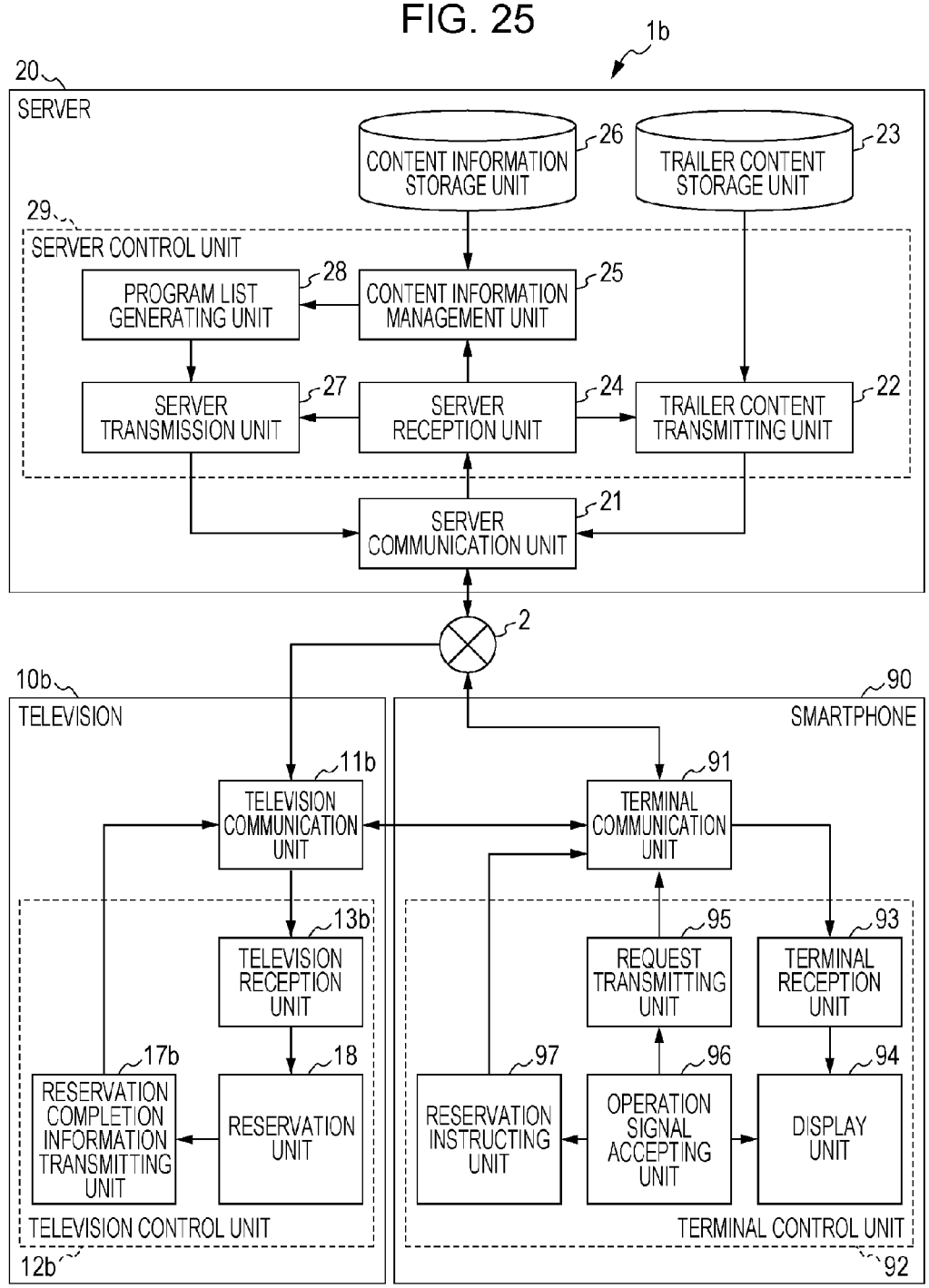
FIG. 25 is a block diagram illustrating a configuration of a reception reservation system according to an eighth embodiment of the present disclosure.
Figure 26:
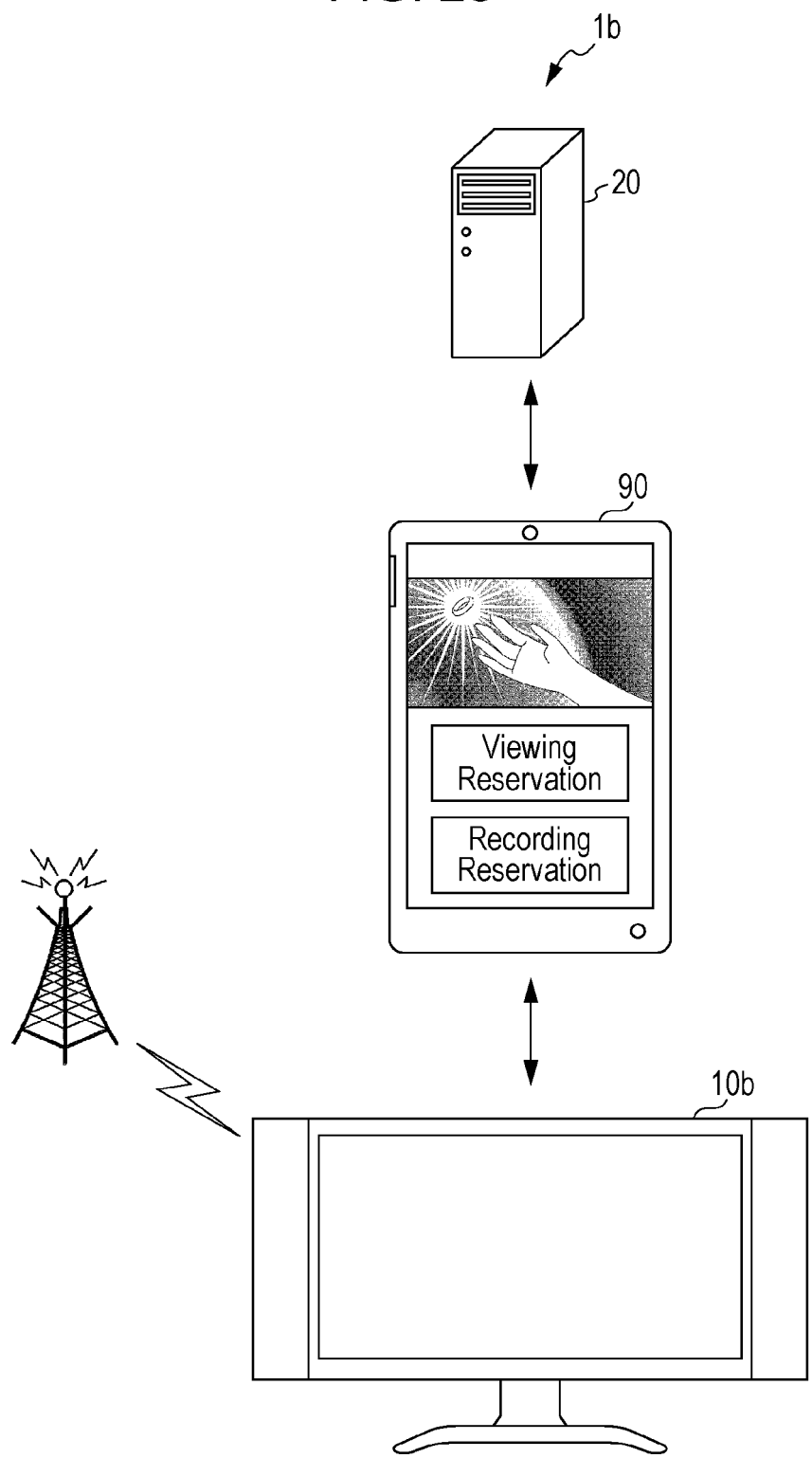
FIG. 26 is a diagram schematically illustrating the reception reservation system according to the eighth embodiment of the present disclosure.

FIG. 26 is a diagram schematically illustrating a reception reservation system 1b according to an eighth embodiment of the present disclosure. As illustrated in FIG. 26, the reception reservation system 1b is constituted by the server 20, a smartphone (display terminal) 90, and a television 10b. Note that description will be given in this embodiment while assuming a smartphone to be a display terminal; however, the display terminal is not limited to a smartphone. The reception reservation system 1b may be configured by using a portable information terminal, such as a tablet PC. The configurations of the server 20, the smartphone 90, and the television 10b that constitute the reception reservation system 1b will be described in detail with reference to FIG. 25.

FIG. 25 is a block diagram illustrating a configuration of the reception reservation system 1b according to the eighth embodiment of the present disclosure. In the reception reservation system 1b, the server 20 has the same configuration as the first embodiment described above, and therefore, description thereof will be omitted. In the reception reservation system 1b, the smartphone 90 receives trailer content, and instructs the television 10b to reserve reception of a broadcast program corresponding to the trailer content.

Configuration of Television 10b

The television 10b includes a television communication unit 11b instead of the television communication unit 11 included in the television 10 in the first embodiment, and a television control unit 12b instead of the television control unit 12 included in the television 10 in the first embodiment.

The television communication unit 11b has a function that enables transmission/reception of data to/from the server 20 or the smartphone 90 over the network 2, and also has a function that enables direct transmission/reception of data to/from the smartphone 90. The functions of the television communication unit 11b are implemented by the communication unit 110 in the hardware configuration illustrated in FIG. 11 described above.

The television control unit 12b includes and functions as a television reception unit (reception reservation accepting unit) 13b instead of the television reception unit 13 in the first embodiment, and also includes and functions as a reservation completion information transmitting unit 17b instead of the reservation completion information transmitting unit 17 in the television control unit 12 in the first embodiment. The functions of the television control unit 12b are implemented by the control unit 120 in the hardware configuration illustrated in FIG. 11 described above.

The television reception unit 13b has the function of the television reception unit 13 in the first embodiment, and further has a function of receiving, via the television communication unit 11b, a reception reservation instruction for reserving reception of a broadcast program.

The reservation completion information transmitting unit 17b transmits, in a case where the television 10b has reserved reception of a broadcast program, reservation completion information indicating that reception has been reserved for the broadcast program, to the server 20 or the smartphone 90 via the television communication unit 11b.

Configuration of Smartphone 90

The smartphone 90 includes a terminal communication unit 91 and a terminal control unit 92, as illustrated in FIG. 25.

The terminal communication unit 91 has a function that enables transmission/reception of data to/from the television 10b or the server 20 over the network 2, and also has a function that enables direct transmission/reception of data to/from the television 10b.

The terminal control unit 92 performs overall control of each unit in the smartphone 90. The terminal control unit 92 will be described in detail below.

Terminal Control Unit 92

The terminal control unit 92 also functions as a terminal reception unit 93, a display unit 94, a request transmitting unit 95, an operation signal accepting unit 96, and a reservation instructing unit 97, as illustrated in FIG. 25.

The terminal reception unit 93 controls the terminal communication unit 91 and receives data received by the terminal communication unit 91 over the network 2.

The display unit 94 refers to the received data and performs control in order to display an image on the display of the smartphone 90.

The request transmitting unit 95 refers to operation information received from the operation signal accepting unit 96 and transmits, via the terminal communication unit 91, a signal that requests the server 20 to transmit data.

The operation signal accepting unit 96 accepts information input by a user, and outputs the accepted information to each unit connected to the operation signal accepting unit 96 as an operation signal.

The reservation instructing unit 97 provides, in a case where the reservation instructing unit 97 has accepted an operation signal requesting reception of a broadcast program, an instruction for reserving reception of the broadcast program, to the television 10b.

Process Performed by Reception Reservation System 1b

Figure 27:
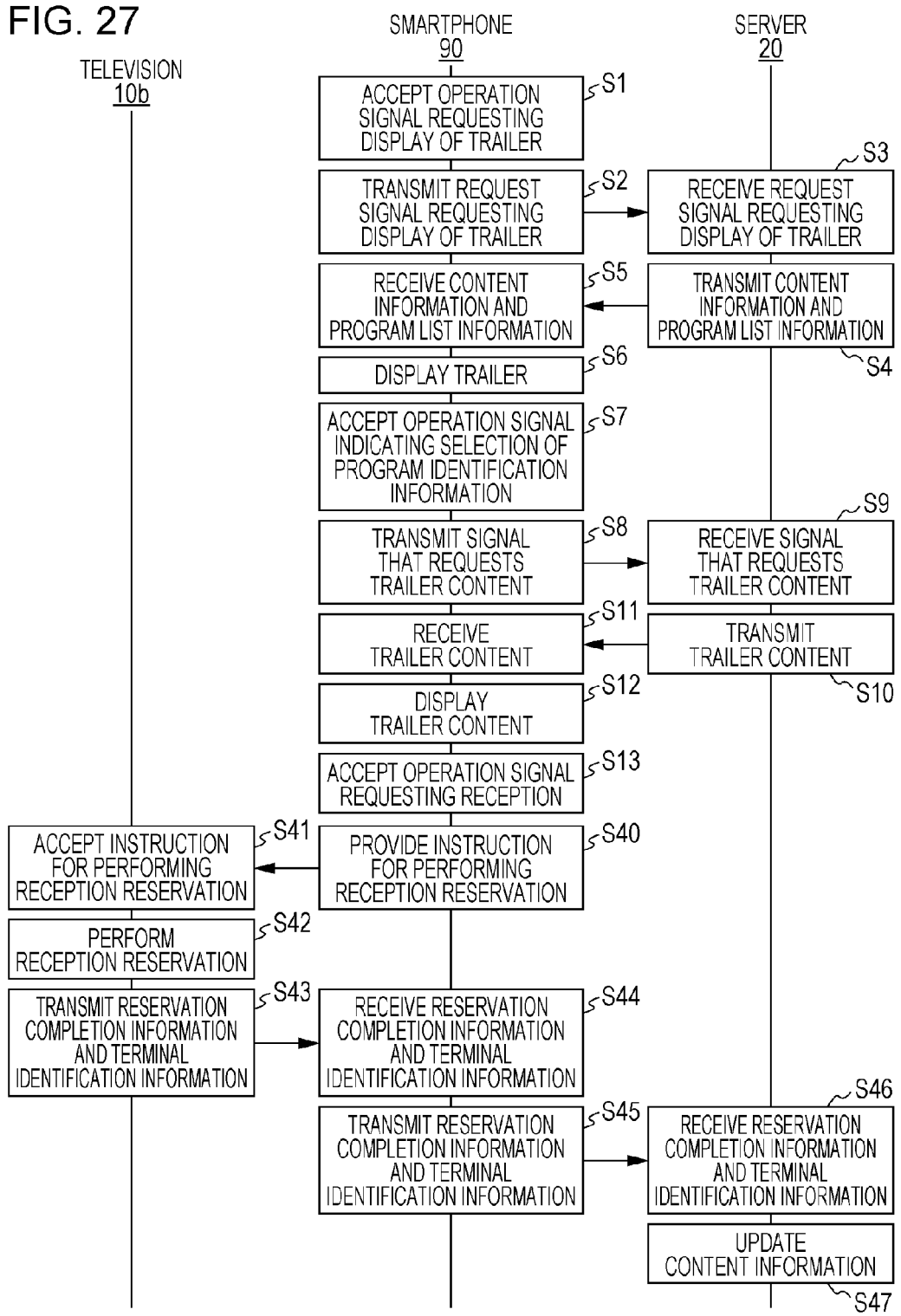
FIG. 27 is a sequence chart illustrating a process performed by the reception reservation system according to the eighth embodiment of the present disclosure.

FIG. 27 is a sequence chart illustrating a process performed by the reception reservation system 1b according to the eighth embodiment of the present disclosure. The process performed by the reception reservation system 1b will be described with reference to FIG. 27.

First, regarding the process from step S1 to step S13 described in the first embodiment described above, part of the process performed by the television 10 is performed by the smartphone 90.

When the operation signal accepting unit 96 has accepted an operation signal requesting reception of a broadcast program in step S13, the operation signal accepting unit 96 outputs the operation signal to the reservation instructing unit 97. The reservation instructing unit 97 provides a reception reservation instruction for reserving reception of the broadcast program to the terminal communication unit 91. The terminal communication unit 91 provides a reception reservation instruction to the television 10b over the network 2 or directly to the television 10b without using the network 2 (step S40). At this time, the reservation instructing unit 97 outputs the reception reservation information included in the piece of content information to the terminal communication unit 91. Note that the process performed by the smartphone 90 to provide a reception reservation instruction to the television 10b will be described in detail below.

The television reception unit 13b accepts the reception reservation instruction from the smartphone 90 via the television communication unit 11b (step S41). The television reception unit 13b provides a reception reservation instruction to the reservation unit 18.

When the reservation unit 18 has accepted the reception reservation instruction from the television reception unit 13b, the reservation unit 18 reserves reception of the broadcast program by referring to the reception reservation information received together with the reception reservation instruction (step S42).

Next, the reservation unit 18 outputs information indicating the broadcast program for which reception has been reserved to the reservation completion information transmitting unit 17b. The reservation completion information transmitting unit 17b transmits reservation completion information indicating that reception has been reserved for the broadcast program indicated by the information received from the reservation unit 18, and terminal identification information that identifies the television 10b, to the smartphone 90 via the television communication unit 11b (step S43).

The terminal reception unit 93 receives the reservation completion information and the terminal identification information via the terminal communication unit 91 (step S44).

The terminal reception unit 93 transmits the received reservation completion information and terminal identification information to the server 20 via the terminal communication unit 91 (step S45).

The server reception unit 24 receives the reservation completion information and the terminal identification information transmitted by the smartphone 90, via the server communication unit 21 (step S46). The server reception unit 24 outputs the received reservation completion information and terminal identification information, to the content information management unit 25.

When the content information management unit 25 has received the reservation completion information and the terminal identification information from the server reception unit 24, the content information management unit 25 obtains a piece of content information corresponding to the broadcast program indicated by the reservation completion information, from the content information storage unit 26. The content information management unit 25 sets "reservation completed", which indicates that reception has been reserved, as the reception reservation completion information in the obtained piece of content information, sets the received terminal identification information as the terminal ID, and stores the updated piece of content information in the content information storage unit 26 (step S47).

Process Performed by Smartphone 90 to Provide Reception Reservation Instruction to Television 10b

Detailed description will be given below of the process performed by the smartphone 90 to provide a reception reservation instruction to the television 10b in step S40 described above.

A Case where the Smartphone 90 is Present in the Vicinity of a Place where the Television 10b is Installed First, a case where the smartphone 90 is present in the vicinity of a place where the television 10b is installed will be described.

In a case where the smartphone 90 is present in the vicinity of a place where the television 10b is installed, the smartphone 90 provides a reception reservation instruction directly to the television 10b without using the network 2.

For example, in a case where the smartphone 90 and the television 10*b* are able to perform wireless LAN communication via an access point (communication based on Wireless Fidelity (WiFi) (registered trademark), for example), the terminal communication unit 91 provides a reception reservation instruction to the television 10*b* via the access point. The television communication unit 11*b* accepts the reception reservation instruction from the smartphone 90 via the access point.

In a case where the smartphone 90 and the television 10*b* are able to perform wireless LAN communication that enables direct transmission/reception of data (communication based on WiFi Direct, for example), the terminal communication unit 91 provides a reception reservation instruction directly to the television 10*b*. The television communication unit 11*b* directly accepts the reception reservation instruction from the smartphone 90. Note that examples of communication that enables direct transmission/reception of data include communication based on Bluetooth (registered trademark).

The smartphone 90 may provide a reception reservation instruction to the television 10*b* by defining in advance a form of infrared communication between the smartphone 90 and the television 10*b*, and transmitting an infrared signal indicating a reception reservation instruction from the smartphone 90.

A Case where the Smartphone 90 is not Present in the Vicinity of a Place where the Television 10*b* is Installed Next, a case where the smartphone 90 is not present in the vicinity of a place where the television 10*b* is installed will be described.

A Case where the Smartphone 90 Stores Information Indicating Acceptance of Reception Reservation First, when the smartphone 90 has accepted an operation signal requesting reception of a broadcast program in step S13 described above, the smartphone 90 stores information indicating that reception reservation of the broadcast program has been accepted, in a memory (not illustrated) of the smartphone 90. In a case where the smartphone 90 comes closer to the place where the television 10*b* is installed, the smartphone 90 provides a reception reservation instruction to the television 10*b* by referring to the information stored in the memory. For example, in a case where the smartphone 90 and the television 10*b* are able to perform wireless LAN communication via an access point (communication based on WiFi, for example), the smartphone 90 provides a reception reservation instruction to the television 10*b* when the smartphone 90 enters an area where the smartphone 90 is able to perform wireless LAN communication via the access point. In a case where communication between the smartphone 90 and the television 10*b* is performed on the basis of Bluetooth, the smartphone 90 similarly provides a reception reservation instruction to the television 10*b* when the smartphone 90 enters an area where the smartphone 90 is able to perform communication based on Bluetooth. In a case where the smartphone 90 and the television 10*b* perform infrared communication, the smartphone 90 needs to accept, from a user, an operation for performing infrared communication, and therefore, the smartphone 90 may display a screen for accepting an operation for performing infrared communication.

A Case where the Smartphone 90 Provides a Reception Reservation Instruction Over the Network 2

Next, a case where the smartphone 90 provides a reception reservation instruction to the television 10*b* over the network 2 will be described with reference to FIG. 28. FIG. 28 is a diagram illustrating a database saved in a remote access server (not illustrated) in the eighth embodiment of the present disclosure. The database table retains the device ID (specifically, the Media Access Control (MAC) address) of the television 10*b* and the MAC addresses of terminals (smartphones 90) that are capable of performing remote access to the television 10*b*, while associating the device ID with the MAC addresses. The remote access server is a server used in order to implement remote access (reception reservation instruction) from the smartphone 90 to the television 10*b*.

A process for establishing a remote connection between the smartphone 90 and the television 10*b* over the network 2 will be described below.

It is assumed that the MAC address of the smartphone 90 or the MAC address of the television 10*b* are not registered in the database table illustrated in FIG. 28. That is, before operations described below start, the smartphone 90 and the television 10*b* are not in a state where remote connection is possible. It is further assumed that a user connects the smartphone 90 to a LAN of the user's home to which the television 10*b* is connected.

Process for Establishing Remote Connection Between Smartphone 90 and Television 10*b*

It is assumed that the television 10*b* has accepted an operation for registering a pair of the smartphone 90 and the television 10*b* in the remote access server, or an operation for turning on the power of the television 10*b*.

The television 10*b* reads a predetermined URL (URL for registration of a base unit) saved in advance in a storage unit (not illustrated), and accesses the URL that has been read. As a result, the television 10*b* is connected to the remote access server, and transmits the MAC address of the television 10*b* to the remote access server.

When the remote access server has received the MAC address of the television 10*b*, the remote access server determines whether or not the received MAC address is saved in the database table. If the remote access server has determined that the received MAC address is not saved in the database table as a result of determination (that is, in a case where the MAC address of the television 10*b* is registered in the remote access server for the first time), the remote access server registers a new record (a record that includes a value "0005" in the "user ID" field and a value equal to the MAC address of the television 10*b* in the "television MAC address" field, for example, in the example illustrated in FIG. 28) in the database table, and a process described below may be performed.

Specifically, the remote access server transmits, to the television 10*b*, html data requested by the television 10*b*. The television 10*b* displays a UI screen represented by the html data. The UI screen includes a field for inputting a user ID, a field for inputting a password, and a transmit button.

When a password has been input and the transmit button has been pressed, the television 10*b* transmits the input password to the remote access server. The remote access server saves the input password in the "password" field in the new record.

Next, it is assumed that the user has activated a target application installed in the smartphone 90, and has performed an operation for registering the smartphone 90 in the remote access server via the activated target application.

The smartphone 90 reads a configuration file of the target application, which has been saved in advance in a storage unit (not illustrated), and accesses a predetermined URL (URL for registration of a remote unit) recorded in the configuration file. As a result, the smartphone 90 is connected to the remote access server, and transmits the MAC address of the smartphone 90 to the remote access server.

When the remote access server has received the MAC address of the smartphone 90, the remote access server determines whether or not a television is present that is connected to the remote access server and that belongs to the same LAN to which the smartphone 90 belongs.

Consequently, the remote access server determines that a television as described above (the television 10*b* in this case) is present, and registers the MAC address of the smartphone 90 in the record in which the MAC address of the television 10*b* is registered.

As a result of the process described above, the pair of the smartphone 90 and the television 10*b* is registered in the remote access server.

Next, it is assumed that the television 10*b* has accepted an operation for making the television 10*b* enter a state where the television 10*b* is able to accept a reception reservation instruction from the smartphone 90.

The television 10*b* reads a predetermined URL (URL to be accessed by a base unit in order to establish a remote connection) saved in advance in the storage unit, and accesses the URL that has been read. As a result, the television 10*b* is connected to the remote access server, and transmits the MAC address of the television 10*b* to the remote access server. Note that the television 10*b* may maintain the connection with the remote access server until the power of the television 10*b* is turned off.

Thereafter, it is assumed that a user has gone out while carrying the smartphone 90 and has performed an operation for making the smartphone 90 remotely access the television 10*b* from outside the user's home (from a foreign country or from a friend's home, for example).

The smartphone 90 accesses a predetermined URL (URL to be accessed by a remote unit in order to establish a remote connection) recorded in the above-described configuration file saved in the storage unit. As a result, the smartphone 90 is connected to the remote access server, and transmits the MAC address of the smartphone 90 to the remote access server.

When the remote access server has received the MAC address of the smartphone 90, the remote access server determines whether or not a record that includes the MAC address of the smartphone 90 and the MAC address of the television 10*b* is present in the database table.

Consequently, the remote access server determines that the record (hereinafter referred to as a "corresponding record") that includes the MAC address of the smartphone 90 and the MAC address of the television 10*b* is present in the database table. The remote access server that has obtained the result of determination transmits, to the smartphone 90, html data requested by the smartphone 90. The smartphone 90 displays a UI screen represented by the html data. The UI screen includes a field for inputting a user ID, a field for inputting a password, and a transmit button.

When a user ID and a password have been input and the transmit button has been pressed, the smartphone 90 transmits the input user ID and password to the remote access server. The remote access server determines whether or not the value in the "user ID" field in the corresponding record is equal to the value of the input user ID, and the value in the "password" field in the corresponding record is equal to the value of the input password (that is, whether or not authentication is successful).

If the remote access server has determined that authentication is successful, the remote access server transmits the Internet Protocol (IP) address (global address) of the smartphone 90 and a connection destination port number, to the television 10*b* that is being connected to the remote access server. In a case where the television 10*b* is not connected to the remote access server at the time when the result of determination that authentication is successful was obtained, the remote access server may notify the smartphone 90 of failure in remote access. If the remote access server has obtained the result of determination that authentication has failed, the remote access server may notify the smartphone 90 of failure in authentication.

When the television 10*b* has received the IP address of the smartphone 90 and the connection destination port number, the television 10*b* establishes a connection with the smartphone 90 by referring to the IP address and the connection destination port number. The smartphone 90 transmits a reception reservation instruction to the television 10*b*.

As a result of the operations described above, it is possible to establish a remote connection between the smartphone 90 and the television 10*b*.

First Modification

In the above-described operations and in operations in a second modification and a third modification described below, a serial number may be used as the device ID instead of a MAC address.

Second Modification

The database table need not include the "user ID" field and the "password" field.

In this case, in a process until the pair of the smartphone 90 and the television 10*b* is registered in the remote access server, the remote access server may operate as described below.

Specifically, if the remote access server has determined that the MAC address of the television 10*b* is not registered in the database table, the remote access server registers a record that includes the MAC address of the television 10*b* as the value of the "television MAC address" field in the database table. However, the remote access server may be configured not to thereafter transmit, to the television 10*b*, the html data that represents the UI screen including the fields for inputting a user ID and a password and the transmit button.

In a process for establishing a remote connection between the smartphone 90 and the television 10*b* after a user has performed an operation for making the smartphone 90 remotely access the television 10*b*, the remote access server may operate as described below.

Specifically, if the remote access server has determined that the record that includes the MAC address of the smartphone 90 and the MAC address of the television 10*b* is present in the database table (that is, in a case where the remote access server has identified a television that is associated with the smartphone 90), the remote access server may transmit, to the identified television (television 10*b*), the IP address of the smartphone 90 and the connection destination port number without performing user authentication.

Note that the remote access server may record the device ID of the identified television 10*b* and the user ID of the user of the smartphone 90 in the storage unit while associating the device ID with the user ID.

Third Modification

In the process for establishing a remote connection between the smartphone 90 and the television 10*b* after a user has performed an operation for making the smartphone 90 remotely access the television 10*b*, the remote access server may operate as described below.

Specifically, when a connection with the smartphone 90 has been established, the remote access server may transmit, to the smartphone 90, the html data that represents the UI screen including the field for inputting a user ID, the field for inputting a password, and the transmit button, without determining whether or not the record that includes the MAC address of the smartphone 90 and the MAC address of the television 10b is present in the database table.

When the UI screen has been displayed on the smartphone 90, a user ID and a password have been input on the UI screen, and the transmit button has been pressed, the smartphone 90 may transmit the input user ID and password to the remote access server. The remote access server may determine whether or not a record is present in the database table, the record including a value equal to the input user ID in the "user ID" field and a value equal to the input password in the "password" field (that is, whether or not user authentication is successful).

If the remote access server has determined that user authentication is successful, the remote access server may identify a television (television 10b) that is being connected to the remote access server and that is associated with the user ID and the password input on the smartphone 90, by referring to the value in the "MAC address" field in the corresponding record. The remote access server may transmit the IP address of the smartphone 90 and the connection destination port number to the television 10b that has been identified.

Note that the remote access server may record the user ID input on the smartphone 90 and the device ID of the television 10b that has been identified in the storage unit while associating the user ID with the device ID.

As described above, in the reception reservation system 1b according to this embodiment, even if a device that receives and displays content information (the smartphone 90 in this embodiment) is different from a device that reserves reception of a corresponding broadcast program (the television 10b in this embodiment), it is possible to show a user trailer content at a timing that the user desires, and to reserve reception of a broadcast program associated with the trailer content. The smartphone 90 that receives and displays content information is portable, and therefore, is able to make the television 10b perform reception reservation even when the user is away from home.

Hardware Configuration of Smartphone 90

Figure 29:
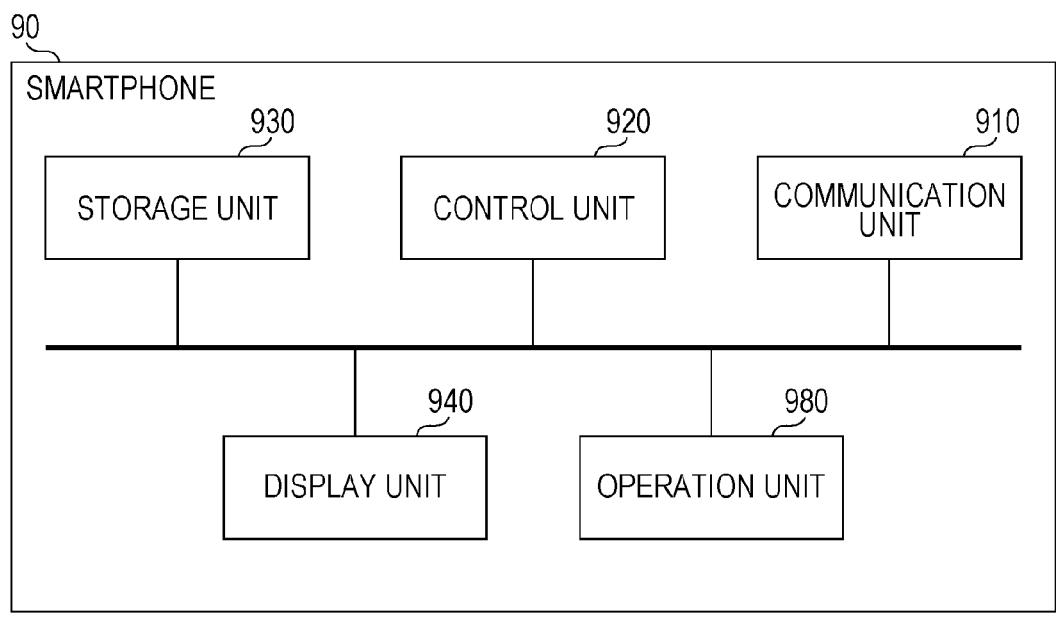
FIG. 29 is a block diagram schematically illustrating a hardware configuration of a smartphone in the eighth embodiment of the present disclosure.

FIG. 29 is a block diagram schematically illustrating a hardware configuration of the smartphone 90 in the eighth embodiment of the present disclosure. As illustrated in FIG. 29, the smartphone 90 includes a communication unit 910, a control unit 920, a storage unit 930, a display unit 940, and an operation unit 980.

The communication unit 910 is an interface for enabling communication with external devices, and implements the function of the terminal communication unit 91. The communication unit 910 is implemented by using a LAN terminal to which a LAN cable is connected, and a wireless LAN interface.

Examples of a device that is usable as the control unit 920 include a CPU. The storage unit 930 includes a main memory and an auxiliary memory. Examples of a device that is usable as the main memory of the storage unit 930 include a semiconductor RAM. Examples of a device that is usable as the auxiliary memory of the storage unit 930 include an HDD.

In the auxiliary memory of the storage unit 930, a control program for operating the smartphone 90 is stored. The control program is a program for implementing the function of the terminal control unit 92 described above. In the auxiliary memory of the storage unit 930, it is also possible to store broadcast programs received by the smartphone 90.

The control unit 920 loads the control program into the main memory of the storage unit 930, and executes various instructions included in the loaded control program to thereby implement the function of the terminal control unit 92 described above.

The display unit 940 is an apparatus that displays images represented by image signals output from the control unit 920. The display unit 940 is implemented by using a transmissive liquid crystal panel having a backlight or an organic EL display, for example.

The operation unit 980 is a UI for accepting user operations input to the smartphone 90. Examples of a device that is usable as the operation unit 980 include hardware keys, switches, and the like.

Ninth Embodiment

The control units of the television 10, the television 10a, the television 10b, the server 20, the recorder 80, and the smartphone 90 (specifically, the television control unit 12, the television control unit 12a, the television control unit 12b, the server control unit 29, the recorder control unit 82, and the terminal control unit 92) may each be implemented by using a logic circuit (hardware) formed on an integrated circuit (IC) chip or by using software running on a CPU.

In the latter case, the television 10, the television 10a, the television 10b, the server 20, the recorder 80, and the smartphone 90 each include a CPU that executes instructions of a program, which is software implementing each function, a read-only memory (ROM) or a storage device (each referred to as a "recording medium") in which the program and various types of data are stored so as to be readable by a computer (or a CPU), a RAM into which the program is loaded, and the like. The computer (or the CPU) reads the program from the recording medium and executes the program to thereby implement the present disclosure. As the recording medium, a "non-transitory tangible medium", such as a tape, a disk, a card, a semiconductor memory, a programmable logic circuit, or the like is usable. The program may be supplied to the computer via any transmission medium (a communication network, a broadcast wave, or the like) that is able to transmit the program. The present disclosure may be implemented in the form of a data signal embedded in a carrier wave, which is embodied by the program being electronically transmitted.

CONCLUSION

According to a first aspect of the present disclosure, there is provided a broadcast receiving terminal (television 10) including: a reception unit (television reception unit 13) for receiving, over a network, trailer content that provides a preview of a broadcast program, and content information associated with the trailer content; a display unit (display unit 14) for displaying the trailer content received by the reception unit; and a reservation unit (reservation unit 18) for reserving reception of the broadcast program with reference to the content information in response to acceptance of an operation signal requesting reception of the broadcast program.

With the above-described configuration, the broadcast receiving terminal is able to receive, from a server, trailer content at a timing that a user desires and to display the trailer content. Furthermore, the broadcast receiving terminal is able to reserve reception of a broadcast program for which the displayed trailer content provides a preview. Accordingly, the broadcast receiving terminal is able to show trailer content at a timing that a user desires and to reserve reception of a broadcast program associated with the trailer content.

According to a second aspect of the present disclosure, in the above-described broadcast receiving terminal, the display unit may display a plurality of pieces of trailer content, the broadcast receiving terminal may further include a trailer content selecting unit for selecting a specific piece of trailer content from among the plurality of pieces of trailer content, and the reservation unit may reserve reception of a broadcast program for which the piece of trailer content that has been selected provides a preview.

With the above-described configuration, the broadcast receiving terminal is able to display a plurality of pieces of trailer content on a display and to reserve reception of a broadcast program for which a piece of trailer content that has been selected provides a preview.

According to a third aspect of the present disclosure, in the above-described broadcast receiving terminal, the reception unit may receive program list information including one or more pieces of program identification information that respectively identify one or more broadcast programs, and the display unit may display a program list that includes the one or more pieces of program identification information with reference to the program list information.

With the above-described configuration, the broadcast receiving terminal is able to simultaneously display pieces of program identification information that respectively identify a plurality of broadcast programs.

According to a fourth aspect of the present disclosure, in the above-described broadcast receiving terminal, the reservation unit may reserve reception of the broadcast program with reference to the content information in response to acceptance of the operation signal requesting reception during a period in which the display unit is displaying the trailer content.

With the above-described configuration, the broadcast receiving terminal is able to reserve reception of a broadcast program on a screen displaying trailer content.

According to a fifth aspect of the present disclosure, in the above-described broadcast receiving terminal, additional information may be associated with each of the one or more pieces of program identification information, the broadcast receiving terminal may further include an extracting unit for extracting one or more pieces of program identification information associated with additional information that satisfies a specific condition, and the display unit may display a program list that includes the one or more pieces of program identification information extracted by the extracting unit.

With the above-described configuration, the broadcast receiving terminal is able to display a program list that includes one or more pieces of program identification information associated with additional information.

According to a sixth aspect of the present disclosure, in the above-described broadcast receiving terminal, the additional information may include at least any of broadcasting station information indicating a broadcasting station that broadcasts a corresponding one of the broadcast programs, attribute information indicating an attribute of the corresponding one of the broadcast programs, broadcast date/time information indicating a broadcast date/time of the corresponding one of the broadcast programs, and charge information indicating whether or not there is a charge for viewing the corresponding one of the broadcast programs.

With the above-described configuration, the broadcast receiving terminal is able to display a program list based on the broadcasting station information, the attribute information, the broadcast date/time information, or the charge information.

According to a seventh aspect of the present disclosure, in the above-described broadcast receiving terminal, the reception unit may receive trailer content associated with a broadcast program identified by a piece of program identification information included in the program list that is displayed by the display unit.

With the above-described configuration, the broadcast receiving terminal is able to display trailer content associated with a broadcast program identified by a piece of program identification information included in the program list.

With the above-described configuration, the broadcast receiving terminal is able to display trailer content associated with a broadcast program identified by a selected piece of program identification information.

According to an eighth aspect of the present disclosure, the above-described broadcast receiving terminal may further include a transmission unit (reservation completion information transmitting unit 17) for transmitting reservation completion information indicating completion of reservation of the broadcast program for which the reservation unit has reserved reception, to an external server that delivers the content information.

With the above-described configuration, the broadcast receiving terminal is able to inform an external server of a broadcast program for which reception has been reserved.

According to a ninth aspect of the present disclosure, the above-described broadcast receiving terminal may request an external server that delivers the content information to transmit the content information.

With the above-described configuration, the broadcast receiving terminal is able to receive content information at a time when a user desires to receive the content information. Note that an operation of "requesting transmission of content information" is not limited to an operation of directly requesting transmission of content information, and may include an operation of indirectly requesting transmission of content information by transmitting an operation signal requesting display of a trailer, for example.

According to a tenth aspect of the present disclosure, there is provided a server (server 20) including: a transmission unit (server transmission unit 27) for transmitting, over a network, content information associated with trailer content that provides a preview of a broadcast program; and a reception unit (server reception unit 24) for receiving reservation completion information indicating that reception of the broadcast program has been reserved, and terminal identification information that identifies a terminal which has reserved reception of the broadcast program. In a case where the reception unit has received the reservation completion information, the transmission unit transmits the content information associated with the trailer content that provides a preview of the broadcast program, and reception reservation completion information indicating that reception has been reserved for the broadcast program.

With the above-described configuration, the server is able to inform the broadcast receiving terminal which has reserved reception that reception has been reserved for the broadcast program.

According to an eleventh aspect of the present disclosure, there is provided a reception reservation system including a broadcast receiving terminal (television 10) and a server (server 20). The broadcast receiving terminal includes: a terminal reception unit (television reception unit 13) for receiving, over a network, trailer content that provides a preview of a broadcast program, and content information associated with the trailer content; a display unit (display unit 14) for displaying the trailer content received by the terminal reception unit; and a reservation unit (reservation unit 18) for reserving reception of the broadcast program with reference to the content information in response to acceptance of an operation signal requesting reception of the broadcast program. The server includes a server transmission unit (server transmission unit 27) for transmitting the content information to the broadcast receiving terminal.

With the above-described configuration, it is possible to attain an effect similar to that attained with the configuration according to the first aspect.

According to a twelfth aspect of the present disclosure, in the above-described reception reservation system, the broadcast receiving terminal may further include a terminal transmission unit (reservation completion information transmitting unit 17) for transmitting reservation completion information indicating completion of reservation of the broadcast program for which the reservation unit has reserved reception, to the server that delivers the content information, and the server may further include a server reception unit (server reception unit 24) for receiving the reservation completion information from the broadcast receiving terminal. In a case where the server reception unit has received the reservation completion information, the server transmission unit may transmit the content information associated with the trailer content that provides a preview of the broadcast program, and reception reservation completion information indicating that reception has been reserved for the broadcast program.

With the above-described configuration, it is possible to attain an effect similar to that attained with the configuration according to the tenth aspect.

According to a thirteenth aspect of the present disclosure, there is provided a non-transitory computer readable recording medium recording a program that makes a computer function as the reception unit, the display unit, and the reservation unit included in the above-described broadcast receiving terminal.

With the above-described configuration, it is possible to implement a recording medium recording a program that makes a computer function as the broadcast receiving terminal.

According to a fourteenth aspect of the present disclosure, there is provided a control method for controlling a server (server 20), the control method including: receiving reservation completion information indicating that reception has been reserved for a broadcast program, and terminal identification information that identifies a terminal which has reserved reception of the broadcast program; and transmitting, over a network, (1) content information associated with trailer content that provides a preview of the broadcast program, and (2) reception reservation completion information indicating that reception has been reserved for the broadcast program, in a case where the reservation completion information has been received.

With the above-described configuration, it is possible to attain an effect similar to that attained with the configuration according to the tenth aspect.

According to a fifteenth aspect of the present disclosure, there are provided reception reservation systems (reception reservation systems 1*a* and 1*b*) respectively including display terminals (television 10*a* and smartphone 90) and broadcast receiving terminals (recorder 80 and television 10*b*). The display terminals respectively include: terminal reception units (television reception unit 13 and terminal reception unit 93) for receiving, over a network, trailer content that provides a preview of a broadcast program, and content information associated with the trailer content; display units (display unit 14 and display unit 94) for displaying the trailer content received by the terminal reception units respectively; and reception reservation instructing units (reservation instructing unit 103 and reservation instructing unit 97) for providing, to the broadcast receiving terminals respectively, a reception reservation instruction for reserving reception of the broadcast program with reference to the content information in response to acceptance of an operation signal requesting reception of the broadcast program. The broadcast receiving terminals respectively include: reception reservation accepting units (recorder external device communication control unit 83 and television reception unit 13*b*) for accepting the reception reservation instruction from the display terminals respectively; and reservation units (reservation unit 18 and reservation unit 84) for reserving reception of the broadcast program with reference to the reception reservation instruction.

With the above-described configuration, in the reception reservation systems, the display terminals display received trailer content and accept reception reservation of a broadcast program corresponding to the trailer content. The display terminals provide a reception reservation instruction for making the respective broadcast receiving terminals perform reception reservation that has been accepted. The broadcast receiving terminals perform reception reservation in accordance with the accepted reception reservation instruction. Accordingly, in any of the reception reservation systems, even if the display terminal that receives and displays trailer content is a terminal different from the broadcast receiving terminal that reserves reception of a broadcast program, it is possible to show a user trailer content at a timing that the user desires and to reserve reception of a broadcast program associated with the trailer content. Note that the display terminal and the broadcast receiving terminal may be implemented by using a portable information terminal and a television respectively, or the display terminal and the broadcast receiving terminal may be implemented by using a television and a recorder respectively.

According to a sixteenth aspect of the present disclosure, there is provided a display terminal (smartphone 90) connected to a broadcast receiving terminal, the display terminal including: a terminal reception unit (terminal reception unit 93) for receiving, over a network, trailer content that provides a preview of a broadcast program, and content information associated with the trailer content; a display unit (display unit 94) for displaying the trailer content received by the terminal reception unit; and a reception reservation instructing unit (reservation instructing unit 97) for providing, to the broadcast receiving terminal, a reception reservation instruction for reserving reception of the broadcast program with reference to the content information in response to acceptance of an operation signal requesting reception of the broadcast program.

With the above-described configuration, it is possible to implement the display terminal used in the above-described reception reservation system.

According to a seventeenth aspect of the present disclosure, there is provided a non-transitory computer readable recording medium recording a program that makes a computer function as the terminal reception unit, the display unit, and the reception reservation instructing unit included in the above-described display terminal.

With the above-described configuration, it is possible to implement a recording medium recording a program that makes a computer function as the display terminal.

According to an eighteenth aspect of the present disclosure, there is provided a broadcast program receiving method performed by a broadcast receiving terminal, the method including: receiving, over a network, trailer content that provides a preview of a broadcast program, and content information associated with the trailer content; displaying the trailer content that has been received; and reserving reception of the broadcast program with reference to the content information in response to acceptance of an operation signal requesting reception of the broadcast program.

With the above-described configuration, it is possible to attain an effect similar to that attained with the configuration according to the first aspect.

According to a nineteenth aspect of the present disclosure, there is provided a broadcast receiving terminal including: a reception unit for receiving, over a network, trailer content that provides a preview of a broadcast program, and content information associated with the trailer content; a display unit for displaying the trailer content received by the reception unit; and a reservation unit for referring to the content information in response to acceptance of an operation signal indicating selection of the broadcast program, and allowing acceptance of reception reservation of the broadcast program.

With the above-described configuration, the broadcast receiving terminal is able to receive, from a server, trailer content at a timing that a user desires and to display the trailer content. Furthermore, the broadcast receiving terminal is able to allow acceptance of reception reservation of a broadcast program for which the displayed trailer content provides a preview. Accordingly, the broadcast receiving terminal is able to show trailer content at a timing that a user desires and to accept reception reservation of a broadcast program associated with the trailer content.

The present disclosure is applicable to a reception reservation system that reserves reception of broadcast programs.

The present disclosure contains subject matter related to that disclosed in Japanese Priority Patent Application JP 2014-062526 filed in the Japan Patent Office on Mar. 25, 2014, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A broadcast receiving terminal comprising:
a reception unit for receiving, over a network, trailer content that provides a preview of a broadcast program, and content information associated with the trailer content, wherein the trailer content is received on demand, at a time the user desires as long as the desired time is within a time period in which a server is allowed to transmit trailer content;
a display unit for displaying the trailer content received by the reception unit, wherein, in response to acceptance of an instruction for an operation when displaying the trailer content, the display unit displays information associated with the trailer content and obtained by using an electronic program guide; and
a reservation unit for reserving reception of the broadcast program with reference to the content information in response to acceptance of an operation signal requesting reception of the broadcast program.

2. The broadcast receiving terminal according to claim 1, wherein
the display unit displays a plurality of pieces of trailer content,
the broadcast receiving terminal further comprises a trailer content selecting unit for selecting a specific piece of trailer content from among the plurality of pieces of trailer content, and
the reservation unit reserves reception of a broadcast program for which the piece of trailer content that has been selected provides a preview.

3. The broadcast receiving terminal according to claim 1, wherein
the reception unit receives program list information including one or more pieces of program identification information that respectively identify one or more broadcast programs, and
the display unit displays a program list that includes the one or more pieces of program identification information with reference to the program list information.

4. The broadcast receiving terminal according to claim 1, wherein
the reservation unit reserves reception of the broadcast program with reference to the content information in response to acceptance of the operation signal requesting reception during a period in which the display unit is displaying the trailer content.

5. The broadcast receiving terminal according to claim 3, wherein
additional information is associated with each of the one or more pieces of program identification information,
the broadcast receiving terminal further comprises an extracting unit for extracting one or more pieces of program identification information associated with additional information that satisfies a specific condition, and
the display unit displays a program list that includes the one or more pieces of program identification information extracted by the extracting unit.

6. The broadcast receiving terminal according to claim 5, wherein
the additional information includes at least any of broadcasting station information indicating a broadcasting station that broadcasts a corresponding one of the broadcast programs, attribute information indicating an attribute of the corresponding one of the broadcast programs, broadcast date/time information indicating a broadcast date/time of the corresponding one of the broadcast programs, and charge information indicating whether or not there is a charge for viewing the corresponding one of the broadcast programs.

7. The broadcast receiving terminal according to claim 3, wherein
the reception unit receives trailer content associated with a broadcast program identified by a piece of program identification information included in the program list that is displayed by the display unit.

8. The broadcast receiving terminal according to claim 1, further comprising:

a transmission unit for transmitting reservation completion information indicating completion of reservation of the broadcast program for which the reservation unit has reserved reception, to an external server that delivers the content information.

9. The broadcast receiving terminal according to claim 1, wherein the broadcast receiving terminal requests an external server that delivers the content information to transmit the content information.

10. A display terminal connected to a broadcast receiving terminal, the display terminal comprising:

a terminal reception unit for receiving, over a network, trailer content that provides a preview of a broadcast program, and content information associated with the trailer content, wherein the trailer content is received on demand, at a time the user desires as long as the desired time is within a time period in which a server is allowed to transmit trailer content;

a display unit for displaying the trailer content received by the terminal reception unit, wherein, in response to acceptance of an instruction for an operation when displaying the trailer content, the display unit displays information associated with the trailer content and obtained by using an electronic program guide; and a reception reservation instructing unit for providing, to the broadcast receiving terminal, a reception reservation instruction for reserving reception of the broadcast program with reference to the content information in response to acceptance of an operation signal requesting reception of the broadcast program.

11. A non-transitory computer readable recording medium recording a program that makes a computer function as the terminal reception unit, the display unit, and the reception reservation instructing unit included in the display terminal according to claim 10.

12. A broadcast receiving terminal comprising:

a reception unit for receiving, over a network, trailer content that provides a preview of a broadcast program, and content information associated with the trailer content, wherein the trailer content is received on demand, at a time the user desires as long as the desired time is within a time period in which a server is allowed to transmit trailer content;

a display unit for displaying the trailer content received by the reception unit, wherein, in response to acceptance of an instruction for an operation when displaying the trailer content, the display unit displays information associated with the trailer content and obtained by using an electronic program guide; and a reservation unit for referring to the content information in response to acceptance of an operation signal indicating selection of the broadcast program, and allowing acceptance of reception reservation of the broadcast program.

* * * * *